(12) United States Patent
Ottino et al.

(10) Patent No.: US 12,215,527 B2
(45) Date of Patent: Feb. 4, 2025

(54) DUAL FUNCTION LATCH ASSEMBLY FOR DUAL DOOR PILLAR-LESS DOOR SYSTEM AND CONTROL SYSTEM FOR CONTROLLING THE LATCH ASSEMBLY

(71) Applicant: Magna Closures Inc., Newmarket (CA)

(72) Inventors: Franco Giovanni Ottino, Newmarket (CA); Francesco Cumbo, Newmarket (CA)

(73) Assignee: Magna Closures Inc., Newmaket (CA)

( * ) Notice: Subject to any disclaimer, the term of this patent is extended or adjusted under 35 U.S.C. 154(b) by 307 days.

(21) Appl. No.: 17/785,453

(22) PCT Filed: Dec. 22, 2020

(86) PCT No.: PCT/CA2020/051786
§ 371 (c)(1),
(2) Date: Jun. 15, 2022

(87) PCT Pub. No.: WO2021/127780
PCT Pub. Date: Jul. 1, 2021

(65) Prior Publication Data
US 2023/0016866 A1    Jan. 19, 2023

Related U.S. Application Data

(60) Provisional application No. 62/952,854, filed on Dec. 23, 2019.

(51) Int. Cl.
*E05B 81/56*       (2014.01)
*B60J 5/04*        (2006.01)
(Continued)

(52) U.S. Cl.
CPC ............. *E05B 81/56* (2013.01); *B60J 5/0479* (2013.01); *E05B 77/48* (2013.01); *E05B 81/04* (2013.01);
(Continued)

(58) Field of Classification Search
CPC .......... E05B 81/78; E05B 81/56; E05B 77/48; E05B 81/04; E05B 81/77; E05B 83/38;
(Continued)

(56) References Cited

U.S. PATENT DOCUMENTS 1,869,274 A    7/1932 Phillips
3,195,945 A    7/1965 Barenyi
(Continued)

FOREIGN PATENT DOCUMENTS

CA        2288225 C    8/2005
CA        2264668 C    5/2006
(Continued)

*Primary Examiner* — Paul N Dickson
*Assistant Examiner* — Sara Laghlam
(74) *Attorney, Agent, or Firm* — Dickinson Wright PLLC

(57) ABSTRACT

A latch assembly for a closure system having first and second closure members each movable between open and closed positions and method of operation are provided. The assembly includes a primary latch mechanism that has a primary actuation group to control actuation of the first closure member. The latch assembly also includes a secondary latch mechanism that has a secondary actuation group operable to control actuation of the second closure member. A controller unit is coupled to the primary and secondary actuation groups and determines which of the primary actuation group and the secondary actuation group to actuate and controls actuation of at least one of the primary actuation group and the secondary actuation group accordingly. The primary and secondary latch mechanisms, primary and secondary actuation groups, and controller unit are all integrated into the housing.

11 Claims, 23 Drawing Sheets

(51) Int. Cl.
  *E05B 77/48*    (2014.01)
  *E05B 81/04*    (2014.01)
  *E05B 81/76*    (2014.01)
  *E05B 83/38*    (2014.01)
  *E05B 85/26*    (2014.01)
  *E05F 15/611*   (2015.01)

(52) U.S. Cl.
  CPC .............. *E05B 81/77* (2013.01); *E05B 83/38* (2013.01); *E05B 85/26* (2013.01); *E05F 15/611* (2015.01); *E05Y 2400/42* (2013.01); *E05Y 2900/531* (2013.01)

(58) Field of Classification Search
  CPC .......... E05B 85/26; E05B 81/86; E05B 81/12; E05B 81/18; B60J 5/0479; E05Y 2400/42; E05Y 2900/531; E05Y 2201/42; E05C 17/006; E05F 15/73
  See application file for complete search history.

(56) References Cited

U.S. PATENT DOCUMENTS

| | | | |
|---|---|---|---|
| 4,615,558 | A | 10/1986 | Nakamura et al. |
| 4,716,623 | A | 1/1988 | Kinaga et al. |
| 5,618,068 | A | 4/1997 | Mitsui et al. |
| 5,688,004 | A | 11/1997 | Karge |
| 6,305,737 | B1 | 10/2001 | Corder et al. |
| 6,382,705 | B1 | 5/2002 | Lang et al. |
| 6,398,271 | B1 | 6/2002 | Tomaszewski et al. |
| 6,616,214 | B2 | 9/2003 | Wattebled |
| 6,681,448 | B2 | 1/2004 | Liang |
| 6,694,676 | B2 | 2/2004 | Sakamoto et al. |
| 6,913,309 | B2 | 7/2005 | Mikolai et al. |
| 6,955,389 | B2 | 10/2005 | Suzuki et al. |
| 6,974,177 | B2 | 12/2005 | Castillo |
| 6,979,046 | B2 | 12/2005 | Moriyama et al. |
| 7,059,654 | B2 | 6/2006 | Ichinose |
| 7,488,029 | B2 | 2/2009 | Lechkun et al. |
| 7,975,349 | B2 | 7/2011 | Broadhead et al. |
| 7,980,621 | B2 | 7/2011 | Elliott et al. |
| 8,162,379 | B2 | 4/2012 | Yano |
| 9,074,402 | B2 | 7/2015 | Higgins et al. |
| 9,217,269 | B2 | 12/2015 | Lobkovich et al. |
| 9,745,773 | B2 | 8/2017 | Halliwell |
| 10,487,553 | B2 | 11/2019 | Iacovoni et al. |
| 10,648,210 | B1 | 5/2020 | Targhi et al. |
| 11,077,798 | B2 | 8/2021 | Salter et al. |
| 2003/0107237 | A1 | 6/2003 | Brodt et al. |
| 2003/0111863 | A1 | 6/2003 | Weyerstall et al. |
| 2007/0008124 | A1 | 1/2007 | Stadler et al. |
| 2007/0046035 | A1 | 3/2007 | Tolley |
| 2007/0152473 | A1 | 7/2007 | Lechkun et al. |
| 2009/0000200 | A1 | 1/2009 | Heuel et al. |
| 2009/0134638 | A1 | 5/2009 | Kutschat |
| 2009/0230699 | A1 | 9/2009 | Carabalona |
| 2010/0181797 | A1 | 7/2010 | Hitomi |
| 2010/0244466 | A1 | 9/2010 | Tomaszewski |
| 2012/0049577 | A1 | 3/2012 | Thomas et al. |
| 2012/0049579 | A1 | 3/2012 | Konchan et al. |
| 2012/0091749 | A1 | 4/2012 | Charnesky et al. |
| 2015/0224859 | A1 | 8/2015 | Warburton et al. |
| 2016/0053517 | A1 | 2/2016 | Tomaszewski |
| 2016/0123060 | A1 | 5/2016 | Choi et al. |
| 2016/0193903 | A1 | 7/2016 | Warburton et al. |
| 2017/0107747 | A1 | 4/2017 | Dente et al. |
| 2017/0254132 | A1 | 9/2017 | Stoof et al. |
| 2017/0267073 | A1 | 9/2017 | Lovelace et al. |
| 2017/0284134 | A1 | 10/2017 | Schwickerath et al. |
| 2018/0016835 | A1 | 1/2018 | Ichinose |
| 2018/0251014 | A1 | 9/2018 | Baccouche et al. |
| 2018/0298647 | A1 | 10/2018 | Baskar et al. |
| 2020/0080348 | A1 | 3/2020 | Cappelli et al. |
| 2020/0102777 | A1 | 4/2020 | Yun et al. |
| 2021/0248394 | A1 | 8/2021 | Sohn et al. |
| 2021/0277695 | A1 | 9/2021 | Bakker et al. |

FOREIGN PATENT DOCUMENTS

| | | | |
|---|---|---|---|
| CA | 2555740 | A1 | 6/2007 |
| CN | 102933782 | B | 6/2015 |
| CN | 108729781 | A | 11/2018 |
| CN | 109424277 | A | 3/2019 |
| CN | 110359787 | A | 10/2019 |
| CN | 110439396 | A | 11/2019 |
| DE | 2432063 | A1 | 1/1976 |
| DE | 3705768 | A1 | 9/1988 |
| DE | 10325232 | A1 | 1/2005 |
| DE | 102004007281 | A1 | 9/2005 |
| DE | 102017202919 | A1 | 9/2017 |
| DE | 102016205426 | A1 | 10/2017 |
| EP | 0103734 | A1 | 3/1984 |
| EP | 1408181 | A2 | 4/2004 |
| EP | 1580365 | A1 | 9/2005 |
| EP | 1077147 | B1 | 3/2006 |
| EP | 2317043 | A2 | 5/2011 |
| EP | 2077368 | A4 | 8/2011 |
| EP | 2317043 | B1 | 10/2017 |
| FR | 2917049 | A1 | 12/2008 |
| GB | 792386 | A | 3/1958 |
| JP | 2722895 | B2 | 3/1998 |
| JP | 2008285824 | A | 11/2008 |
| KR | 101199223 | B1 | 11/2012 |
| WO | 2003071064 | A1 | 8/2003 |
| WO | 2006060921 | A1 | 6/2006 |
| WO | 2014037502 | A1 | 3/2014 |
| WO | 2016133873 | A1 | 8/2016 |
| WO | 2020097662 | A1 | 5/2020 |

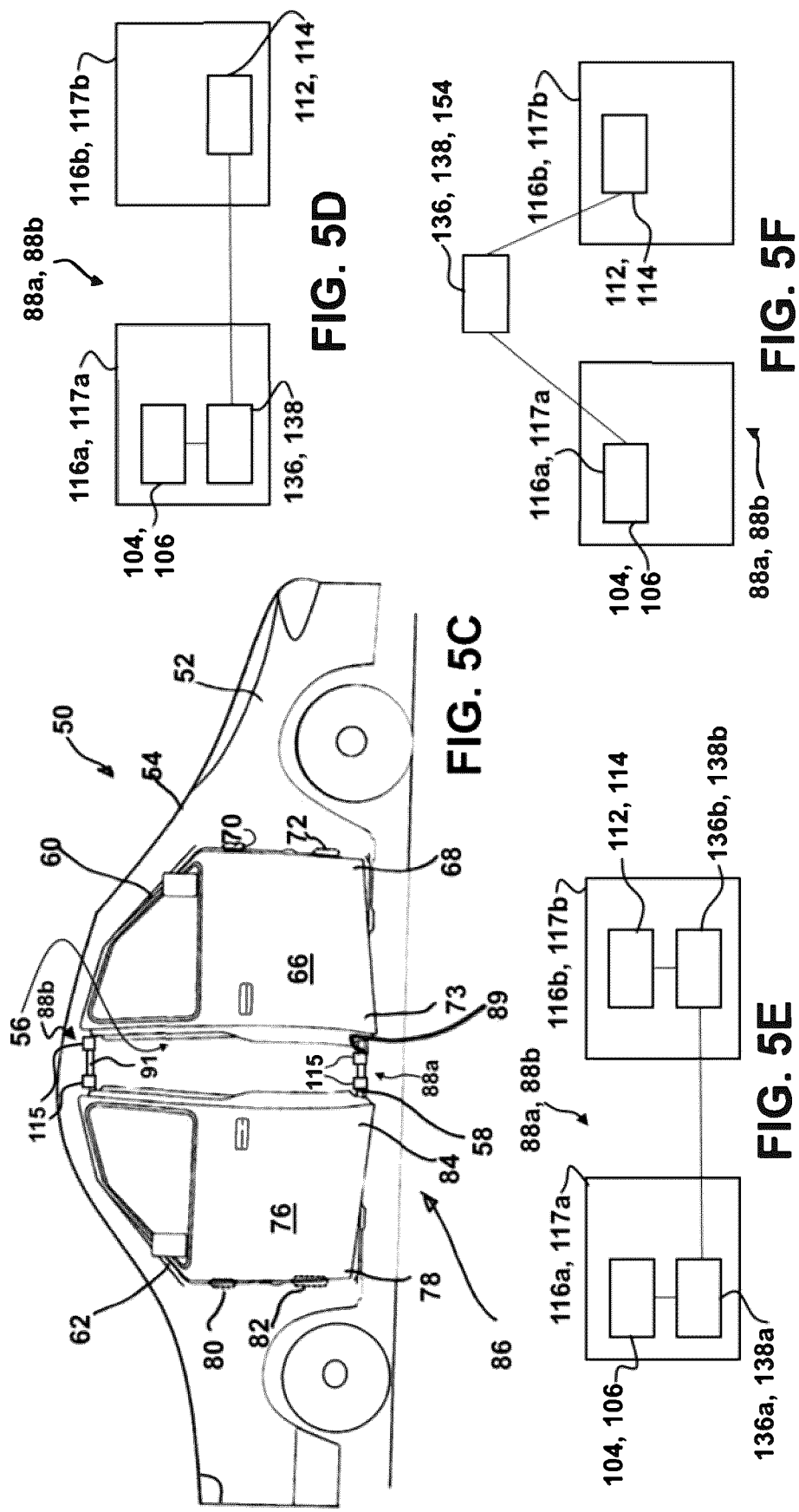

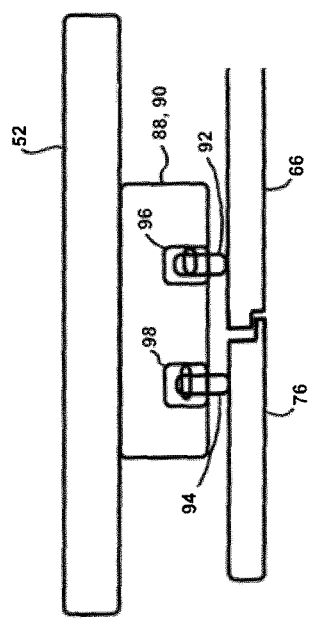
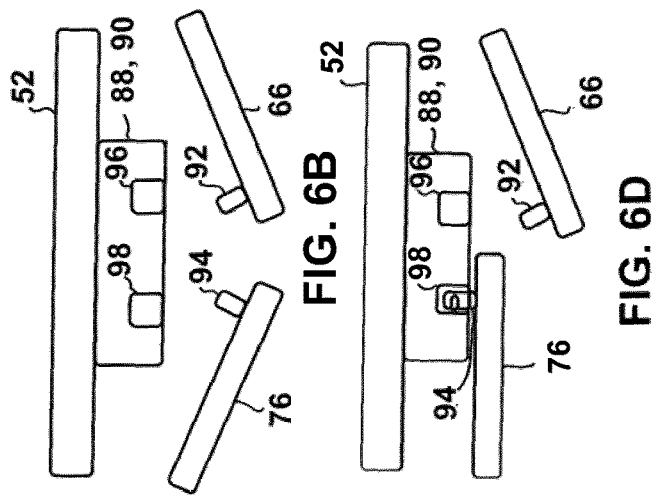
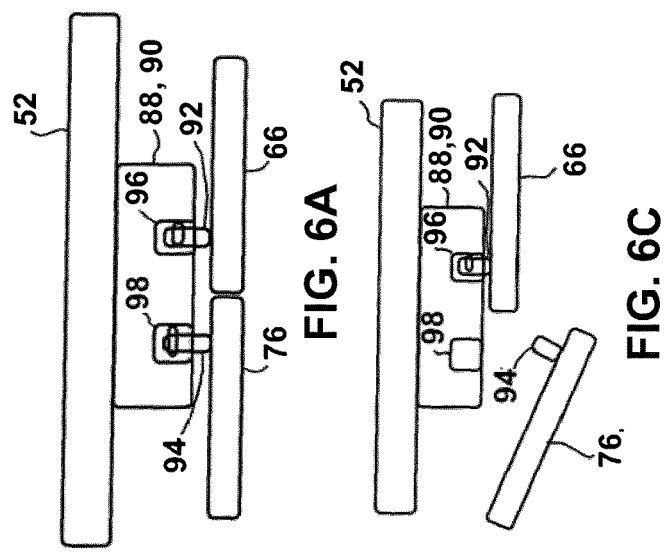

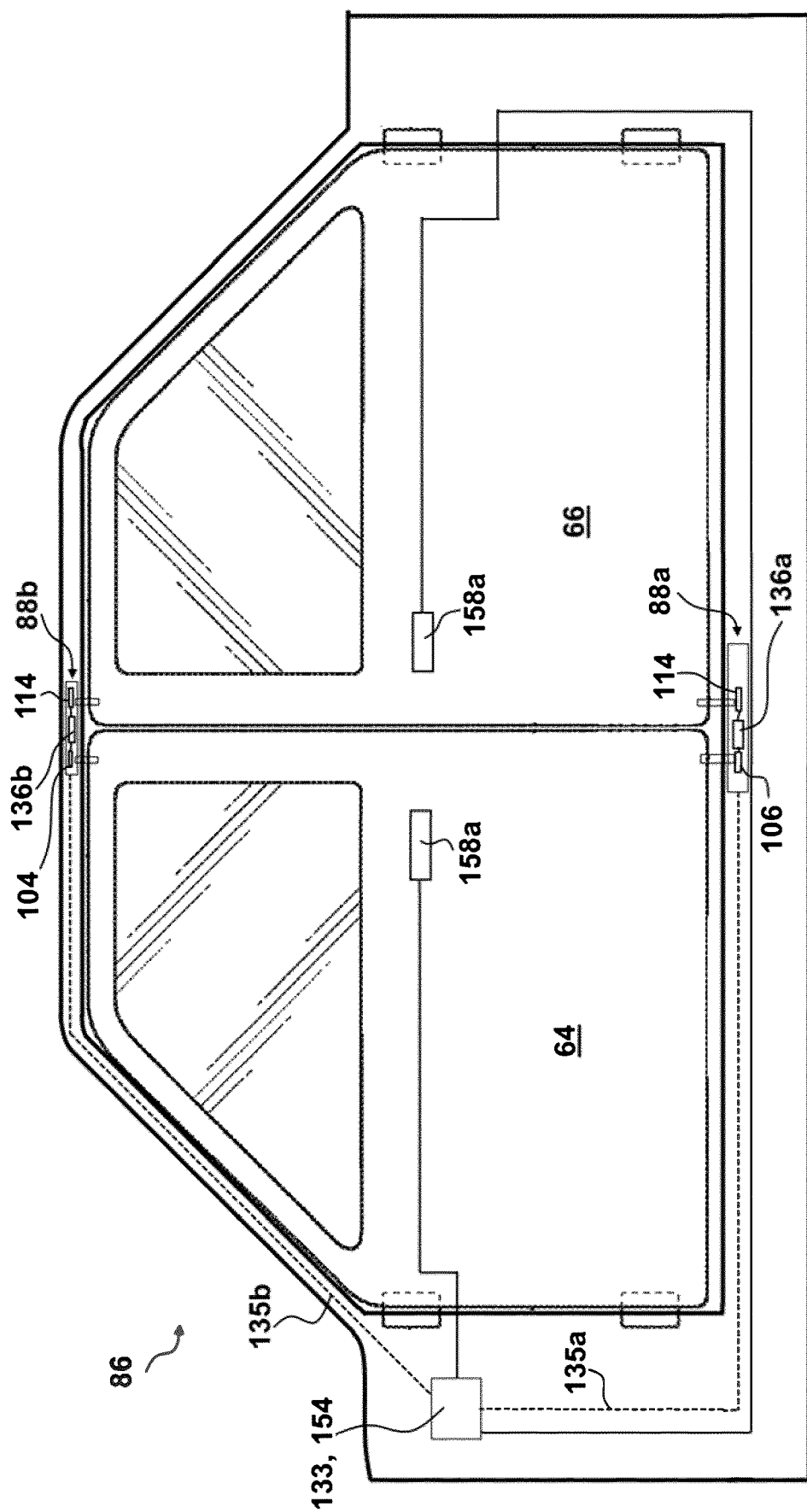

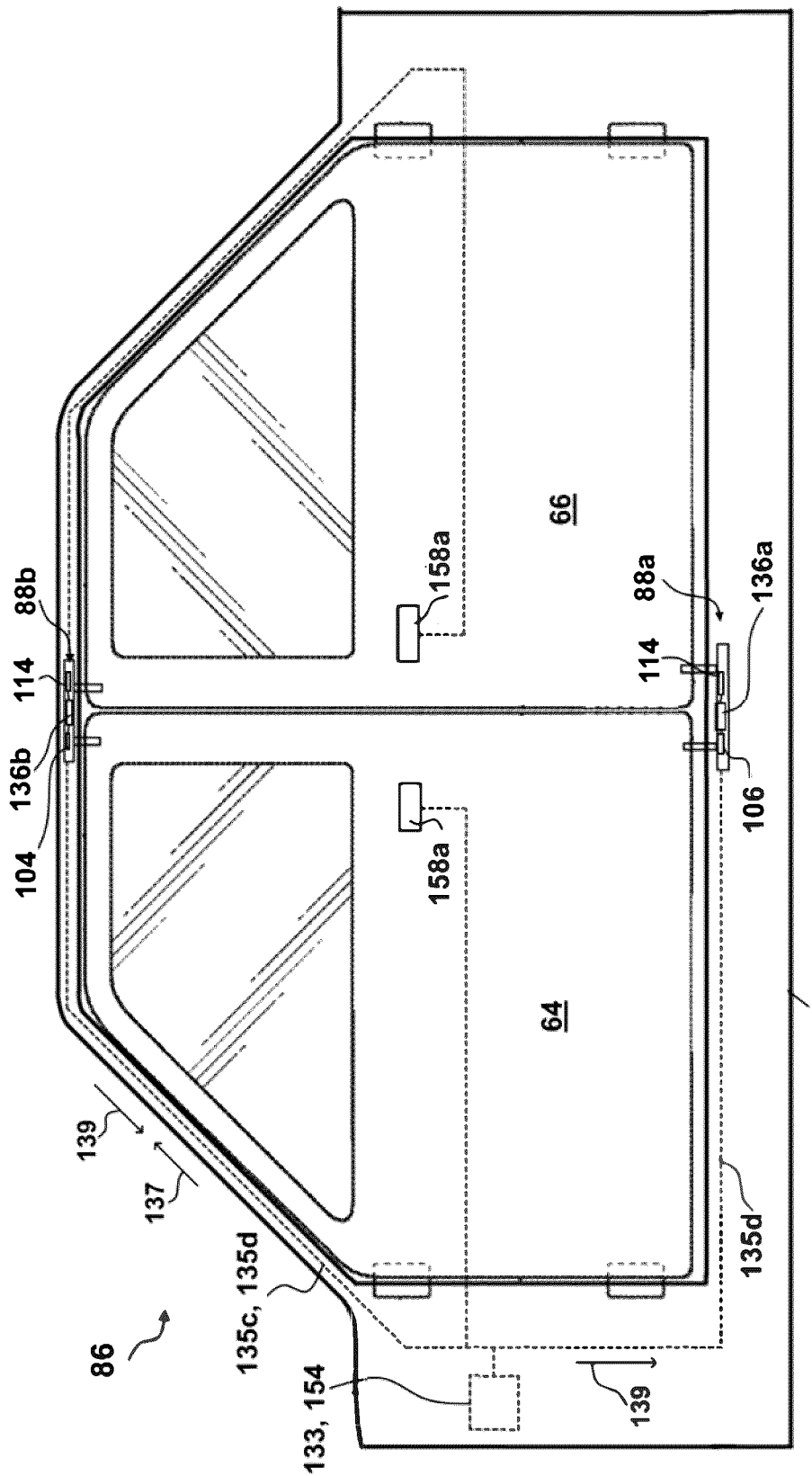

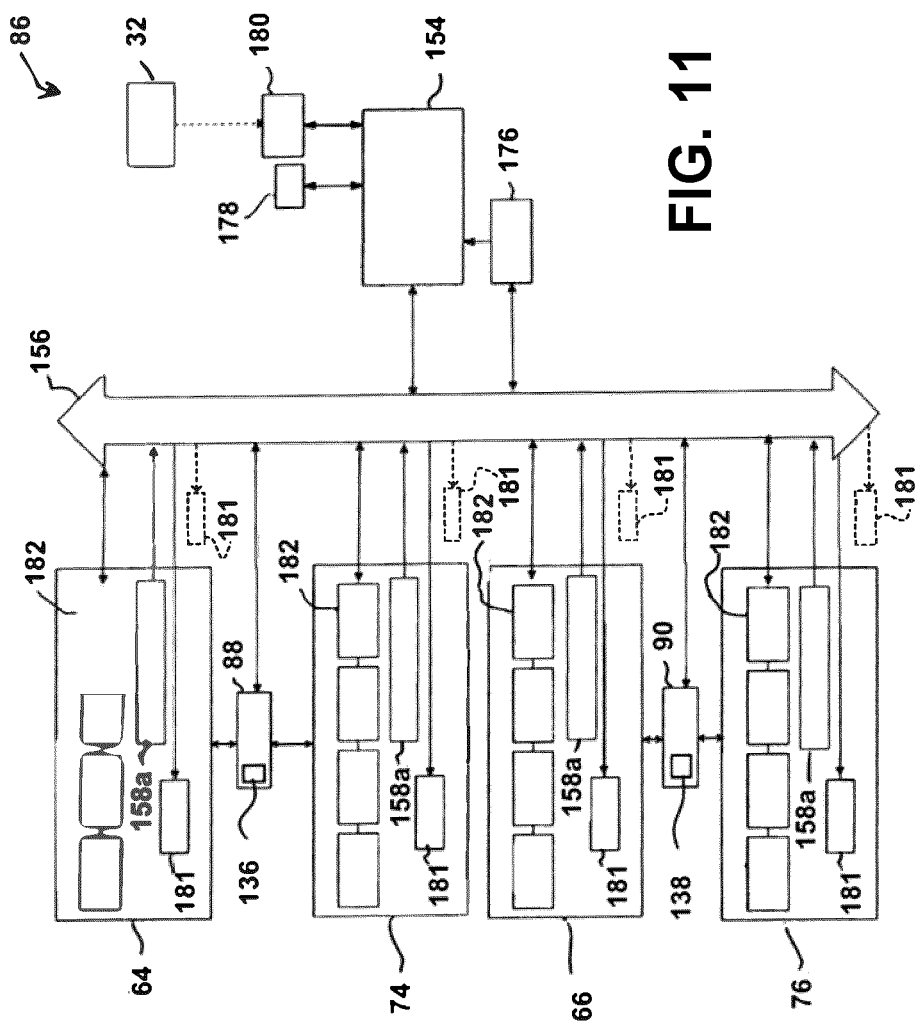

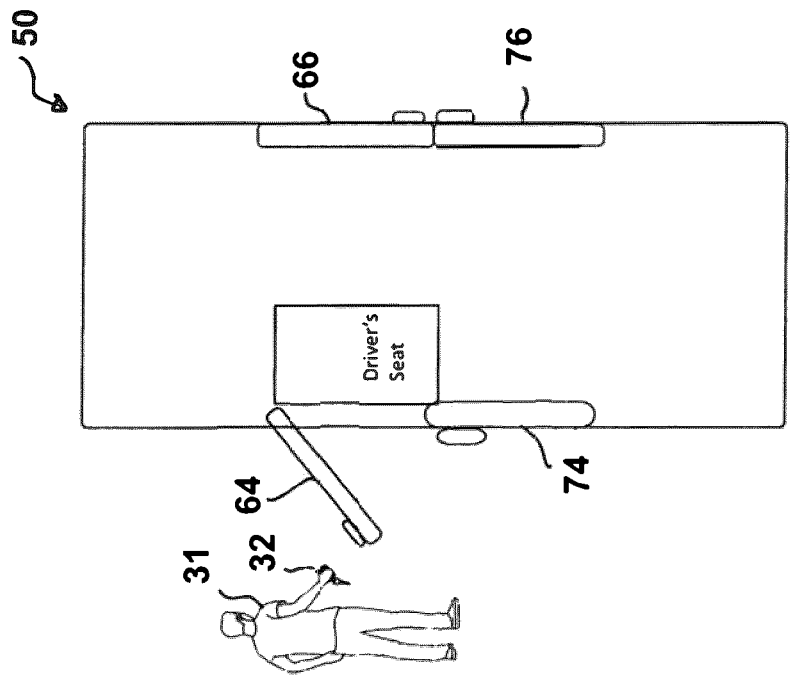
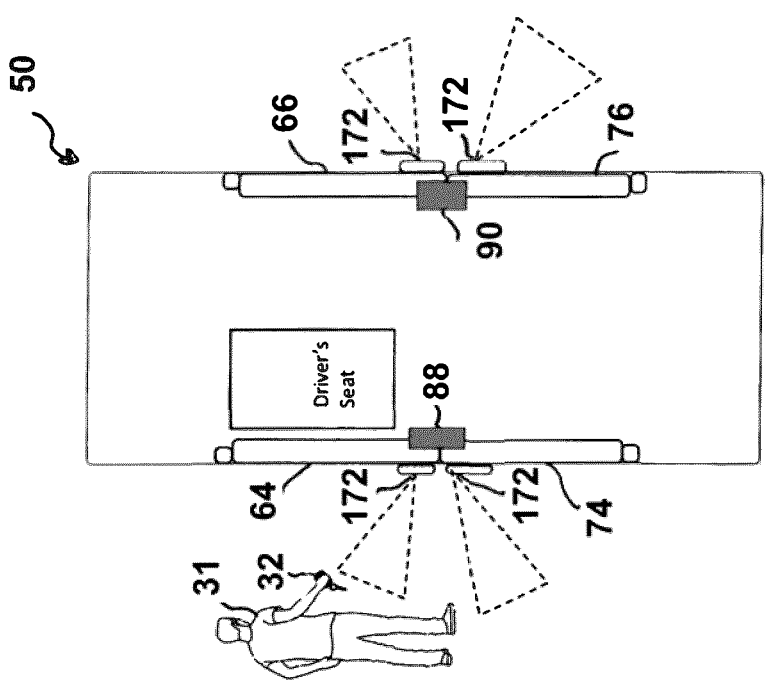

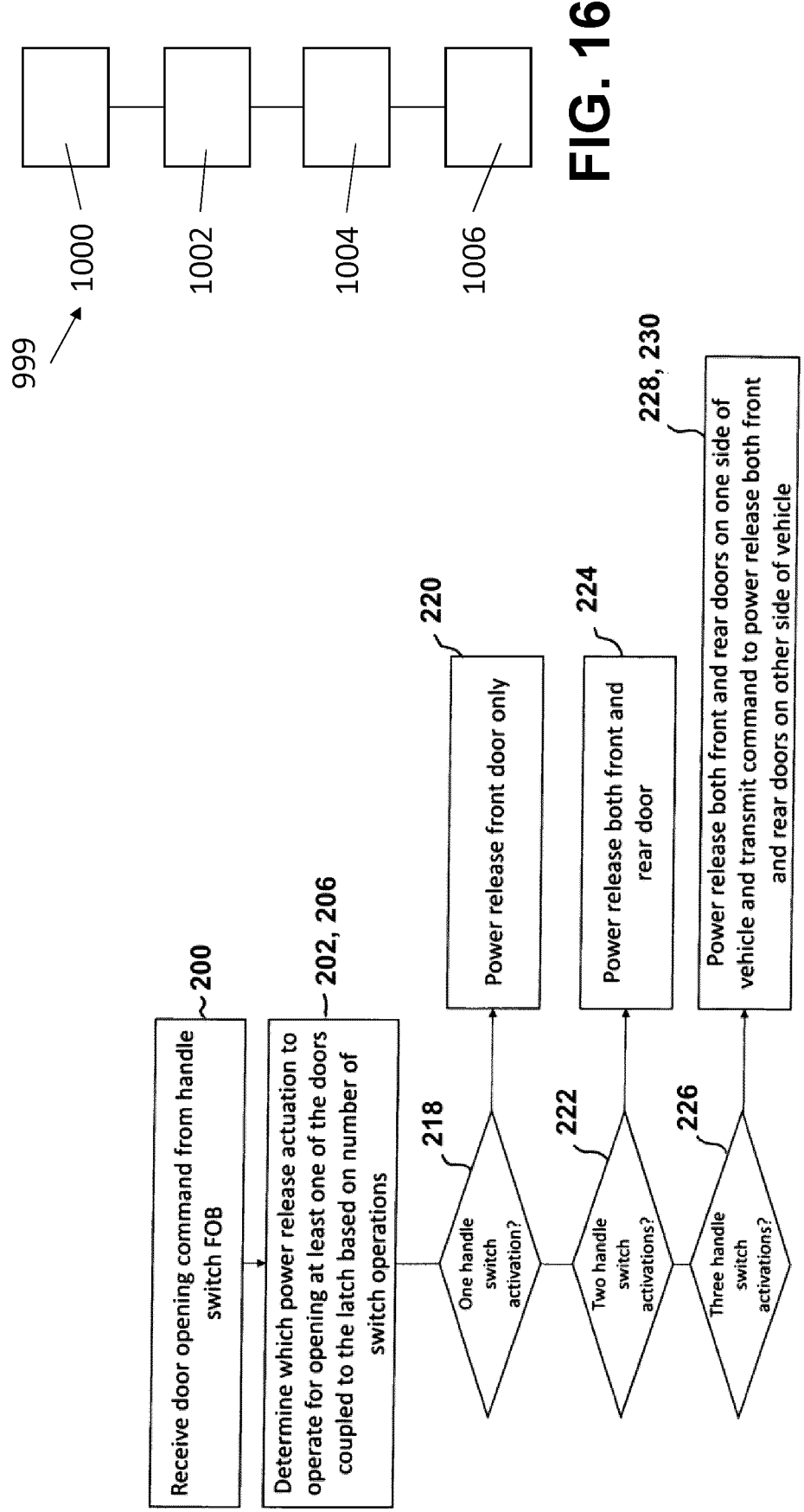

DUAL FUNCTION LATCH ASSEMBLY FOR DUAL DOOR PILLAR-LESS DOOR SYSTEM AND CONTROL SYSTEM FOR CONTROLLING THE LATCH ASSEMBLY

CROSS-REFERENCE TO RELATED APPLICATIONS

This application is a U.S. National Stage of International Application No. PCT/CA2020/051786, filed on Dec. 22, 2020, which claims the benefit of U.S. Provisional Application Ser. No. 62/952,854, filed on Dec. 23, 2019, which are both incorporated herein by reference in their entirety.

FIELD

The present disclosure relates generally to closure member systems for motor vehicles and, more particularly, to a dual function latch assembly for a dual door pillar-less door system for securing vehicle doors of the door system relative to a vehicle body and a control system for controlling the latch assembly.

BACKGROUND

This section provides background information related to the present disclosure which is not necessarily prior art.

A typical motor vehicle is equipped with at least one pair of doors to provide access to a passenger compartment. Specifically, most vehicles include driver-side and passenger-side swing doors that are pivotably supported from the vehicle body to move between closed and open positions. These doors are each equipped with a latch assembly having a latch mechanism operable in a latched mode to hold the door in its closed position and in an unlatched mode to permit movement of the door to its open position. The latch assembly is also equipped with a latch release mechanism that is selectively actuated (manually via a handle-actuated release system and/or via a power-operated release system) to shift the latch mechanism into its unlatched mode.

Many vehicles are equipped with multiple side (i.e., front and rear) doors for access to the passenger compartment. Most commonly, when viewed from the front of the vehicle 10, the front and rear side doors 12, 14 are hinged proximate their front edge to be moveable relative to a vehicle body 15 as best shown in FIG. 1. The front doors 12 are hinged to a front structural pillar (i.e., the A-pillar 16), while the rear doors 14 are hinged to an intermediate structural pillar (i.e., the B-pillar 18), which is situated between the front and rear doors 12, 14. The latch assemblies 20 associated with the front doors 12 are arranged to latch with a front striker (not shown) fixed to the B-pillar 18. Likewise, the latch assemblies 22 associated with the rear doors 14 are arranged to latch with a rear striker 24 fixed to a rearward, vertically extending shut face 25 of the opening 26.

In some vehicles, such as pick-up trucks with extended cabs, the vehicle body is formed with an enlarged door opening without a structural B-pillar. Such "pillar-less" dual-door closure systems typically include a front swing door pivotably hinged along its front edge to the front vertical structural portion (i.e., the A-pillar), of the door opening and a rear swing door pivotably hinged along its rear edge to a rear vertical structural portion (i.e., the C-pillar), of the door opening. The absence of the intermediate structural pillar (i.e., the B-pillar), requires that one or both of the front and rear doors latches along at least one of upper and lower portions of the enlarged access opening while the front door latches directly to the rear door or also latches one of upper and lower portions of the enlarged access opening. If, for example, the front door latches to the rear door, the latch assembly in the rear door cannot be unlatched until the front door latch assembly has been released and the front door swung to its open position.

Such latch assemblies may additionally include power locking/unlocking, power release and/or power cinching. These "powered" features are provided by a closure latch assembly mounted to the closure panel or door and which is typically equipped with a ratchet and pawl type of latch mechanism controlled via at least one power-operated actuator. Typically, the closure panel is held in a closed position by virtue of the ratchet being held in a striker capture position to releasably retain a striker that is mounted to a structural body portion of the vehicle. The ratchet is held in its striker capture position by the pawl engaging the ratchet when the pawl is located in a ratchet holding position.

In latch assemblies providing a power release feature, the latch release mechanism is typically controlled by a power-operated release actuator. A single power-operated actuator, or separate power-operated actuators, can be used in association with the power release and power cinching features. The power release feature is typically independent from the power cinching feature and may also be used as part of a passive entry feature.

Referring back to FIG. 1, when a person approaches the vehicle 10 with an electronic key fob and actuates (i.e. pulls) an outside door handle 27 or commands unlatching via the key fob, the latch assembly (e.g., latch assemblies 20 associated with the front doors 12 and/or latch assemblies 22 associated with the rear doors 14) actuates the power release function to release the latch mechanism and unlatch the latch assembly for opening the door (e.g., front door 12 and/or rear door 14). Nevertheless, such power release functionality may be more difficult to implement in pillar-less door systems. In addition, because the front door 14 by itself or all doors (front and rear doors 12, 14) are typically unlocked simultaneously, security issues may arise due to doors 12, 14 also being unlocked on the opposite side of the vehicle 10.

In view of the above, there remains a need to develop alternative latch assemblies which address and overcome limitations and drawbacks associated with known dual door pillar-less door systems as well as to provide increased convenience and enhanced operational capabilities.

SUMMARY

This section provides a general summary of the present disclosure and is not a comprehensive disclosure of its full scope or all of its features, aspects and objectives.

It is an aspect of the present disclosure to provide a latch assembly for a closure system having first and second closure members each movable between open and closed positions. The latch assembly includes a primary latch mechanism for the first closure member that has a primary actuation group operable to control actuation of the first closure member. In addition, the latch assembly includes a secondary latch mechanism for the second closure member that has a secondary actuation group operable to control actuation of the second closure member. The primary latch mechanism, primary actuation group, secondary latch mechanism and secondary actuation group are all integrated into the housing. The latch assembly additionally includes a controller unit that is coupled to the primary and secondary actuation groups and is configured to determine which of the primary actuation group and the secondary actuation group to actuate. The controller unit controls actuation of at least one of the primary actuation group and the secondary actuation group accordingly.

In accordance with another aspect of the disclosure, the controller unit can be disposed and integrated into the housing.

In accordance with another aspect of the disclosure, the controller unit is configured to control actuation of the primary actuation group and the secondary actuation group in independent relation from one another.

In accordance with another aspect of the disclosure, a switching unit can be coupled to the controller unit, to the primary actuation group and to the secondary actuation group, with the controller unit being configured to control the switching unit to actuate and control actuation of the at least one of the primary actuation group and the secondary actuation group in independent relation from one another.

In accordance with another aspect of the disclosure, the primary actuation group of the primary latch mechanism can include a primary ratchet moveable between a striker release position and a striker capture position, a primary pawl moveable between a ratchet holding position for holding the primary ratchet in its striker capture position and a ratchet releasing position for permitting the primary ratchet to move to its striker release position and the primary actuation group is operable for moving the primary pawl between its ratchet holding position and its ratchet release position; and the secondary actuation group of the secondary latch mechanism can include a secondary ratchet moveable between a striker release position and a striker capture position, a secondary pawl moveable between a ratchet holding position for holding the secondary ratchet in its striker capture position and a ratchet releasing position for permitting the secondary ratchet to move to its striker release position and the secondary actuation group is operable for moving the secondary pawl between its ratchet holding position and its ratchet release position.

In accordance with another aspect of the disclosure, the first closure member can include a pair of front doors on opposite sides of a vehicle and the second closure member can include a pair of rear doors on opposite sides of the vehicle, wherein the controller unit includes a first side controller unit and a second side controller unit, each of the first side controller unit and the second side controller unit being configured to selectively actuate the primary actuation group and the secondary actuation group associated with the first closure member and the second closure member on the same side of the vehicle without actuating the primary actuation group and the secondary actuation group associated the first closure member and the second closure member on the opposite side of the vehicle.

In accordance with another aspect of the disclosure, each of the first side controller unit and the second side controller unit is configured to selectively actuate the primary actuation group and the secondary actuation group associated with the first closure member and the second closure member on the same side of the vehicle such that each first closure member and second closure member on the same side of the vehicle can be controlled independently from one another.

In accordance with another aspect of the disclosure, a plurality of obstacle detection sensors can be configured in communication with the first side controller unit and the second side controller unit and configured to detect an object and/or a gesture adjacent the first closure members and the second closure members wherein the first side controller unit is configured to adjust the control of the actuation of the at least one of the primary actuation group and the secondary actuation group based on the detection of the object or the gesture and the second side controller unit is configured to adjust the control of the actuation of the other of the primary actuation group and the secondary actuation group based on the detection of the object or the gesture.

In accordance with another aspect of the disclosure, the first side controller unit can be configured in operable communication with a separate first motor of each the first closure member and the second closure member on the same side of the vehicle to control actuation of the first motors to prevent the respective first closure member and the second closure member from impacting the detected object and configuring the second side controller unit in operable communication with a separate second motor of each the first closure member and the second closure member on the opposite side of the vehicle to control actuation of the second motors to prevent the respective first closure member and the second closure member from impacting the detected object.

It is another aspect of the disclosure is to provide a dual door pillar-less door system for a motor vehicle with a first front door and a first rear door disposed on a first side of the motor vehicle and a second front door and a second rear door disposed on a second side of the motor vehicle opposite the first side. The door system includes a first side latch assembly that includes a first primary latch mechanism for the first front door that has a first primary actuation group operable to control actuation of the first front door. The first side latch assembly also has a first secondary latch mechanism for the first rear door that has a first secondary actuation group operable to control actuation of the first rear door. In addition, the first side latch assembly has a first side controller unit coupled to the first primary and first secondary actuation groups and is configured to control actuation of at least one of the first primary actuation group and the first secondary actuation group. The door system also includes a second side latch assembly having a second primary latch mechanism for the second front door that has a second primary actuation group operable to control actuation of the second front door. In addition, the second side latch assembly includes a second secondary latch mechanism for the second rear door that has a second secondary actuation group operable to control actuation of the second rear door. The second side latch assembly additionally includes a second side controller unit in communication with the first side controller unit and coupled to the second primary and second secondary actuation groups and configured to control actuation of at least one of the second primary actuation group and the second secondary actuation group.

Yet another aspect of the disclosure is to provide a method of operating a dual door pillar-less door system of a vehicle with a plurality of closure members is also provided. The method includes the step of receiving at least one closure member opening command from an input source selected from the group comprising a handle switch, a body control module, or a key fob. The method continues with the step of determining which of a primary actuation group and a secondary actuation group of at least one latch assembly to actuate. The next step of the method is controlling actuation of at least one of the primary actuation group and the secondary actuation group of the at least one latch assembly based on the determination of which of the primary actuation group and the secondary actuation group to actuate.

Yet another aspect of the present disclosure relates to a dual door pillar-less door system for a motor vehicle with a front door and a rear door, the dual door pillar-less door system including: an upper latch assembly including an first primary latch mechanism for the front door and having a first primary actuation group operable to control actuation of the front door and a secondary latch mechanism for the rear door and having a first secondary actuation group operable to control actuation of the rear door; and a lower latch assembly including a second primary latch mechanism for the front door and having a second primary actuation group operable to control actuation of the front door and a second secondary latch mechanism for the rear door and having a second secondary actuation group operable to control actuation of the rear door. The first primary actuation group and the second primary actuation group are operable together to control actuation of the front door, and the first secondary actuation group and the second secondary actuation group are operable together to control actuation of the rear door. In a related aspect, the first primary actuation group and the second primary actuation group and the first secondary actuation group and the second secondary actuation group are electrically actuatable. In a related aspect, the first primary actuation group and the second primary actuation group are controlled by a first controller unit, and the first secondary actuation group and the second secondary actuation group are controlled by a second controller unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5C depicts an additional example motor vehicle with a "pillar-less" door system with first and second moveable closure members latched using an upper latch assembly and a lower latch assembly associated with each of a front and rear door, according to aspects of the disclosure;

FIG. 5D depicts a block diagram of a master-slave control configuration for a latch assembly, in accordance with aspects of the disclosure;

FIG. 5E depicts a block diagram of a distributed control configuration for a latch assembly, in accordance with aspects of the disclosure;

FIG. 5F depicts a block diagram of a remote control configuration for a latch assembly, in accordance with aspects of the disclosure;

FIGS. 6A-6D show operation of the latch assembly of FIG. 5A, 5B according to aspects of the disclosure;

FIG. 6E shows an overlapping B-pillar less door configuration, according to aspects of the disclosure;

FIG. 8F depicts an illustrative wiring diagram for the control system of FIG. 8D, according to aspects of the disclosure;

FIG. 8G depicts an illustrative wiring diagram for the control system of FIG. 8E, according to aspects of the disclosure;

FIGS. 10 and 11 are block diagrams of the door system including a plurality of obstacle detection sensors according to aspects of the disclosure;

FIGS. 12A-12D depict operation of the door system using the latch assembly on each of the first side and the second side of the motor vehicle while using the plurality of obstacle detection sensors according to aspects of the disclosure;

FIGS. 13-15 show steps of a method of operating the door system according to aspects of the disclosure; and FIG. 16 shows steps of a method of operating a dual pillar-less door system according to further aspects of the disclosure.

DETAILED DESCRIPTION OF EXAMPLE EMBODIMENTS

In the following description, details are set forth to provide an understanding of the present disclosure. In some instances, certain circuits, structures and techniques have not been described or shown in detail in order not to obscure the disclosure.

In general, at least one example embodiment of a latch assembly for a dual door pillar-less door system and corresponding door system constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

Figure 1:
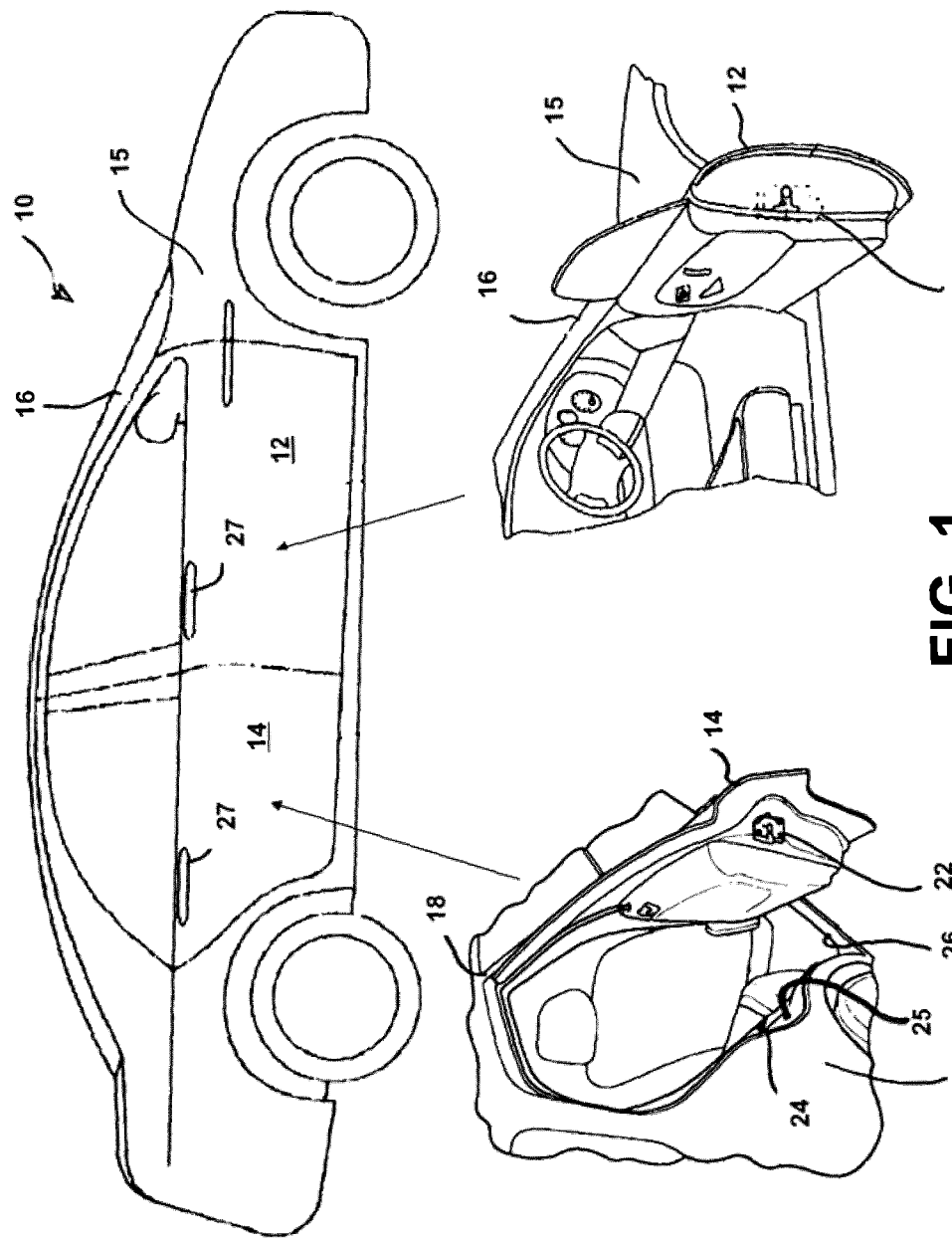
FIG. 1 shows a motor vehicle equipped with separate latch assemblies for each door in accordance with the prior art.
Figure 3:
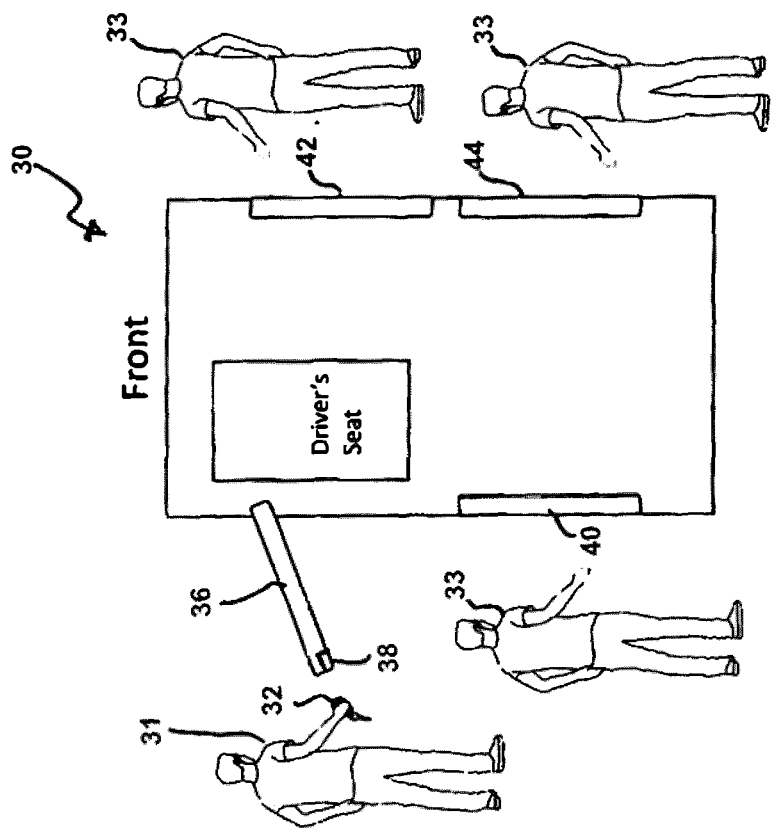
FIGS. 2-4 show another motor vehicle equipped with separate latch assemblies for each door that are operated by a passive entry feature used in conjunction with an electronic key fob.
Figure 2:
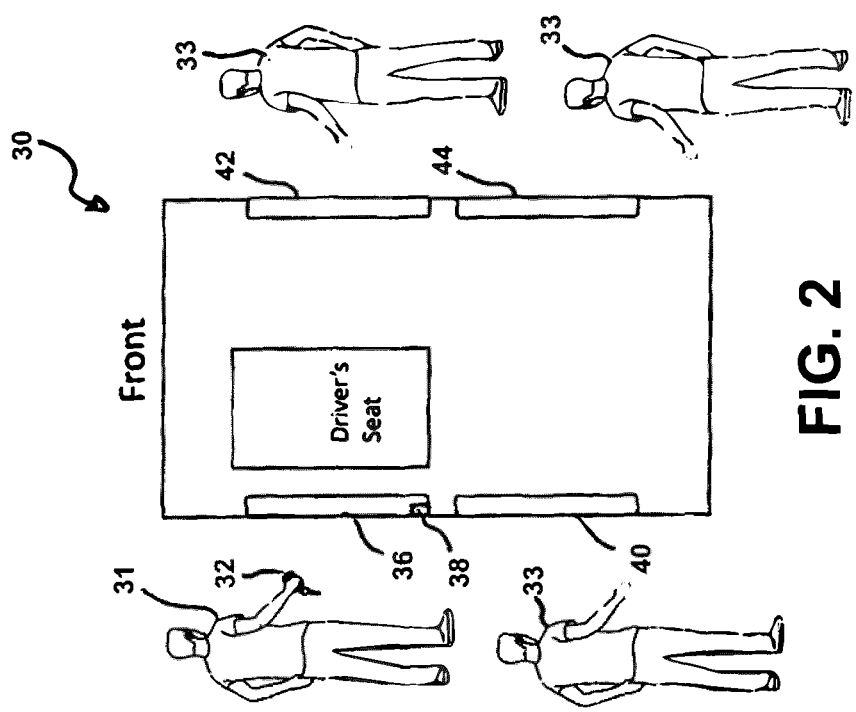
Figure 4:
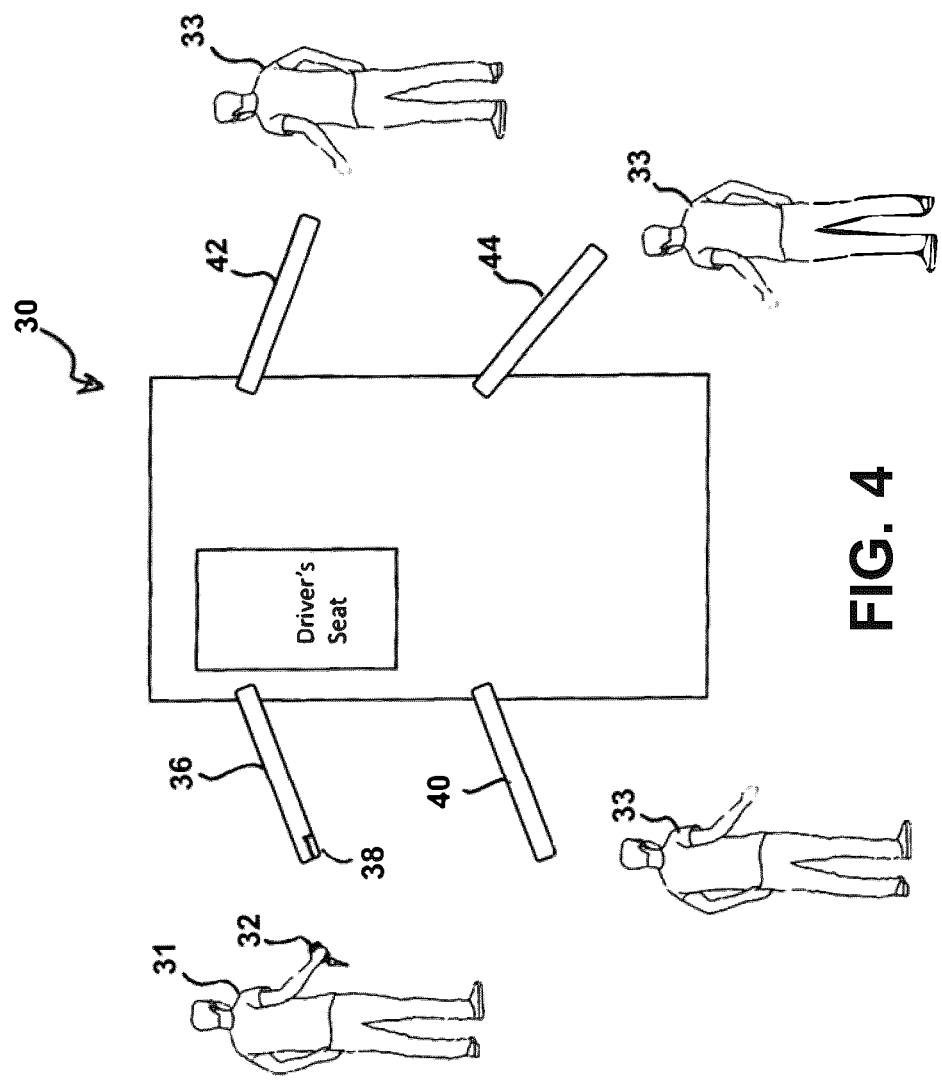

Referring to FIGS. 2-4, for a vehicle 30 with a passive entry feature, a person 31 may approach the vehicle 30 and actuate (i.e. pull) an outside door handle 34 or electronically command unlatching with an electronic key fob 32. For example, a single command from the key fob 32 can be used for unlatching a driver's side front door 36 (i.e., the driver's door). Consequently, a latch assembly 38 associated with the driver's side front door 36 actuates the power release function to release a latch mechanism of the latch assembly 38 and unlatch for opening the driver's side front door 36. A second or subsequent command from the key fob 32 can be used for unlatching the remaining doors for passengers 33 (e.g., driver's side rear door 40, passenger's side front door 42 opposite the driver's side front door 36, and passenger's side rear door 44 opposite the driver's side rear door 40) as shown in FIG. 4. Accordingly, all of the doors 36, 40, 42, 44 are unlocked by the second command from the key fob 32, even if the person 31 only wants to unlock the driver's side rear door 40. Thus, such operation can allow security issues on the opposite side of the vehicle 30 (e.g., an intruder could gain unauthorized entry to the vehicle 30 through the passenger's side front door 42 and/or the passenger's side rear door 44 following the second command from the key fob 32).

Figure 5A:
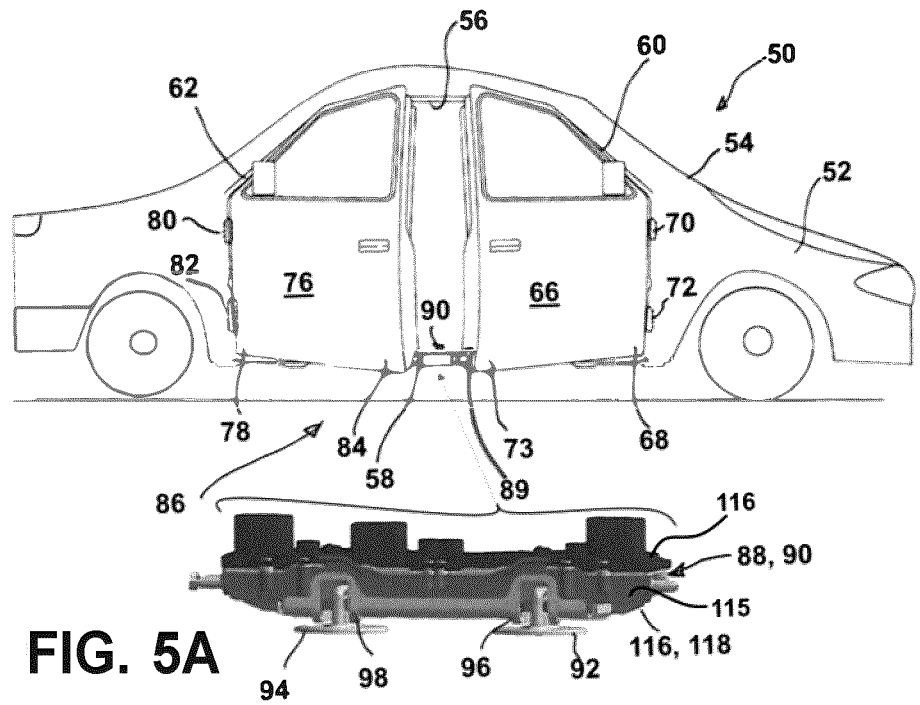
FIG. 5A depicts an additional example motor vehicle with a "pillar-less" door system with first and second moveable closure members latched using a single latch assembly according to aspects of the disclosure.

Referring initially to FIG. 5A, an example motor vehicle 50 is shown to include a vehicle body 52 having an exterior 54 and an interior 56 defining a passenger compartment. Connecting exterior 54 and interior 56 of vehicle body 52 is a continuous or "pillar-less" side opening 58 defining a first or front terminal end 60 and a second or rear terminal end 62. Providing a first moveable closure member for a front portion of opening 58 is a second front door 66 opposite a first front door 64 (FIGS. 9A-9D) and having a forward portion 68 pivotably connected via upper and lower passenger front hinges 70, 72 to vehicle body 52, for example to the A-pillar of the vehicle, adjacent to front terminal end 60 of opening 58. Second front door 66 has a rearward portion 73 generally opposite its pivotal connection to vehicle body 52. Providing a second moveable closure member for a rear portion of opening 58 is a second rear door 76 opposite a first rear door 74 (FIGS. 9A-9D). Second rear door 76 has a rearward portion 78 which is pivotably connected via upper and lower passenger rear hinges 80, 82 to vehicle body 52, such as to a C-pillar of the vehicle body, adjacent to rear terminal end 62 of opening 58 and has a forward portion 84 generally opposite to its pivotal connection. Other types of coupling of the doors to the vehicle body may be provided. The front door 64, 66 and the rear door 74, 76, may abut or nearly abut in the center of the opening 58 where a B-pillar connecting the upper lintel and the bottom sill would otherwise be provided. For example a seal 101 may be provided between the front door 64, 66 and the rear door 74, 76, such as part of a sealing arrangement as shown in U.S. Pat. No. 10,337,227 entitled "Rear access door latch and sealing systems", the entire contents of which are incorporated herein by reference in its entirety. Illustratively, the front door 66 and the rear door 76 are shown as mounted to the vehicle body 52 using pivotal connections, such as pivoting hinges, but other mounting types may be provided. When second front door 66 and second rear door 76 are closed together, the extreme end of rearward portion 73 of second front door 66 may or may not overlap the extreme end of forward portion 84 of second rear door 76. Such an example of an overlapping configuration of front and rear doors 64, 74 is shown in FIG. 6E, whereas FIGS. 6A to 6D are examples of a non-overlapping configuration of front and rear doors for a b-pillar less door system. So, the first front door 64 and the first rear door 74 can be moveable independently from one another between their open and close positions without having to open one of the doors 64, 74 in order to open the other of the doors 64, 74. For example, the primary actuation group 104, 106 may be controlled to release the first closure member 64, 66 without the secondary actuation group 112, 114 being controlled to release the second closure member 74, 76. For example, the primary actuation group 104, 106 may be controlled to release the first closure member 64, 66 and the secondary actuation group 112, 114 may be controlled simultaneously to release the second closure member 74, 76. For example, the secondary actuation group 112, 114 may be controlled to release the second closure member 74, 76 without the primary actuation group 104, 106 being controlled to release the first closure member 64, 66. The primary actuation group 104, 106 and secondary actuation group 112, 114 each include separate motors, which are electrically actuated, such that a sequential operation of the primary actuation group 104, 106 followed by the secondary actuation group 112, 114, or vice versa, is not required, as would be required in a configuration having only a single motor to control both the primary actuation group 104, 106 and secondary actuation group 112, 114. It is to be recognized that the first front door 64 and the first rear door 74 are disposed on a first side (driver's side) of the motor vehicle 50 and the second front door 66 and the second rear door 76 are disposed on a second side (passenger side) of the motor vehicle 50 opposite the first side.

A dual door pillar-less door system 86 for motor vehicle 50 is provided in accordance with one aspect of the disclosure. Dual pillar-less door system 86 in includes at least one latch assembly 88, 90, with an exemplary dual door pillar-less door system 86 illustrated having latch assemblies 88, 90 on each side of the motor vehicle 50. Still referring to FIG. 5A, the second side latch assembly 90 for the closure system 86 is attached to the vehicle body 52 (e.g., along a lower portion, such as a horizontally extending door sill 89 of opening 58, by way of example and without limitation) for independently latching the first closure member (e.g., second front door 66) and the second closure member (e.g., second rear door 76). The opposite or first side of the vehicle 50 similarly includes a first side latch assembly 88 for independently latching the first front door 64 and first rear door 74. Still referring to FIG. 5A, the second side latch assembly 90 for the closure system 86 is attached to the vehicle body 52 (e.g., along a lower portion, such as a horizontally extending door sill 89 of opening 58, by way of example and without limitation) for independently latching the first closure member (e.g., second front door 66) and the second closure member (e.g., second rear door 76). The opposite or first side of the vehicle 50 similarly includes a first side latch assembly 88 for independently latching the first front door 64 and first rear door 74.

Figure 5B:
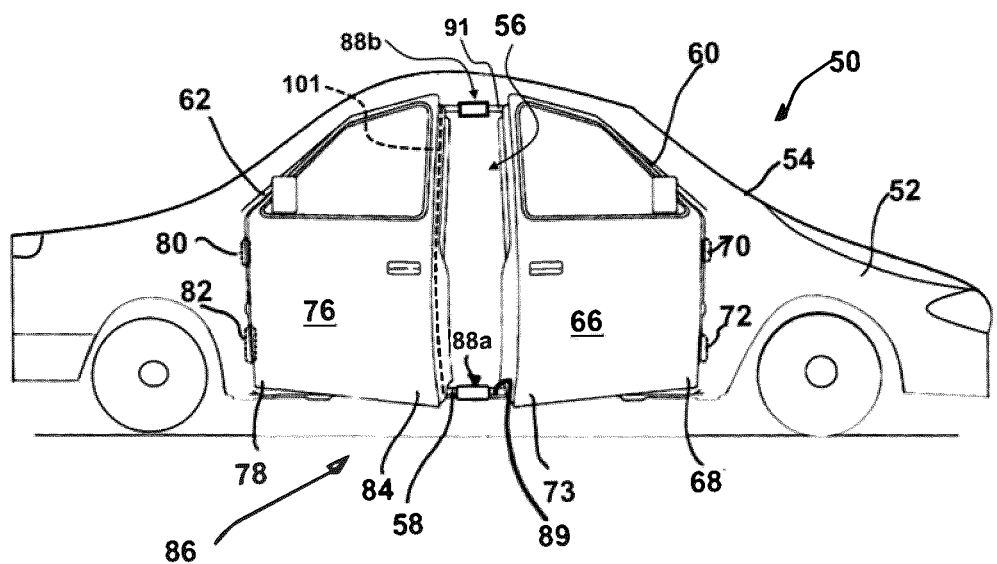
FIG. 5B depicts an additional example motor vehicle with a "pillar-less" door system with first and second moveable closure members latched using an upper latch assembly and a lower latch assembly according to aspects of the disclosure.

With reference to FIG. 5B, dual pillar-less door system 86 may illustratively be configured having on each side a lower latch assembly, such as a lower latch assembly 88*a* and an upper latch assembly, such as an upper latch assembly 88*b* on the first side of the motor vehicle 50. One side of the vehicle 50 is shown for illustrative reasons, but a similar configuration may be provided on the other side of the vehicle. Lower latch assembly 88*a* may be attached to the vehicle body 52 (e.g., along a lower frame portion extending between the lower portions of the A-pillar and the C-pillar, such as a horizontally extending door sill 89 or rocker panel below opening 58, by way of example and without limitation), and upper latch assembly 88*b* may be attached to the vehicle body 52 (e.g., along a upper frame portion extending between the upper portions of the A-pillar and the C-pillar, such as a horizontally extending door lintel 91 above opening 58, by way of example and without limitation). Lower and upper latch assemblies 88*a*, 88*b* may be provided on opposites sides of the opening 58 as shown in FIG. 5B. Lower and upper latch assembles 88*a*, 88*b* may each be mounted to separate frame plates 115 (e.g. two separate latches for each upper and lower locations) which are each in turn mounted to the vehicle body 52 as illustratively shown in FIG. 5C. In another possible configuration, lower and upper latch assembles 88*a*, 88*b*, may each have two separate frame plates 117 mounted at the sill 89 and lintel 91 portions with each having one of the primary actuation group 104, 112 and the secondary actuation group 106, 114 associated with a separate frame plate 117, or housing 116 connected to frame plate 177. In such a configuration as shown in FIG. 5C, the controller unit 136, 138 may be associated with one housing 116 or one frame plate 117 (e.g. a first frame plate 117*a* and a first associated housing 116*a*, and a second second frame plate 117*b* and second associate housing 117*b*) associated with one of the primary actuation group 104, 112 and the secondary actuation group 106, 114 of each upper or lower latch assembly (see FIG. 5D); or the controller unit 136, 138 may be distributed between both the separate frame plates 117 of an upper or lower latch assembly (such as two controller units 136*a*, 138*a*, and 136*b* and 138*b*) within two separate housings 116*a*, 116*b*, and on separate frame plates 117*a*, 117*b*) and electrically connected with one another (see FIG. 5E); or the controller unit (136, 138) may be remote from both the frame plates 117*a, b* and housings 116*a, b* of an upper or lower latch assembly, such as may be provided as part of a central control module or node, or for example with the Body Control Module as examples (see FIG. 5F), and as such not provided within the housing 116, but rather within a separate housing mounted at another location in the vehicle 50.

Operation of second side latch assembly 90, for example, is best shown in FIGS. 6A-6D. The first and second closure members (e.g., second front door 66 and second rear door 76) each respectively include strikers 92, 94 attached thereto that are independently received by second primary (front) and second secondary (rear) fish-mouths 96, 98 of the second side latch assembly 90. First side latch assembly 88 provides similar operation for first front door 64 and first rear door 74. Both latch assemblies 88, 90 allow one or both closure members (e.g., second front door 66 and second rear door 76) to open and close independently, regardless of the state of one another.

Those skilled in the art will recognize that the particular location of the latch assemblies 88, 90, such as on the door sills 89 for example, as shown for second side latch assembly 90 is merely intended to illustrate one exemplary dual-door latching arrangement and is not intended to limit the present disclosure. Furthermore, the first side and second side latch assemblies 88, 90 may be employed in other automotive latching configurations, such as a hood latch, a cargo door latch, a decklid latch, a glass latch, a sliding door latch, an auxiliary latch, an emergency release latch, a seat latch, a liftgate latch, a tailgate latch, and the like. Likewise, the type of latch release mechanism employed is not relevant to the inventive concepts associated with the present disclosure and those skilled in the art will appreciate that any known power latch release mechanism can be associated with each of the latch assemblies 88, 90. Dual-door systems may also include sliding door systems, tailgate systems, access hatch systems, or other ingress/egress systems.

Figure 7C:
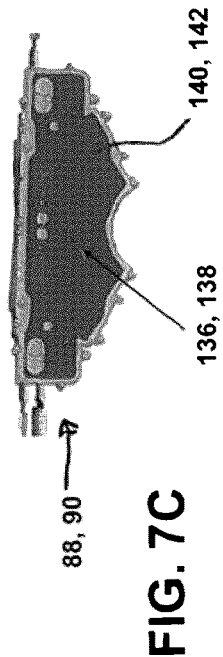
FIGS. 7A-7E show latch mechanisms with actuation groups for the first and second closure members of the latch assembly according to aspects of the disclosure.
Figure 7D:
Figure 7E:
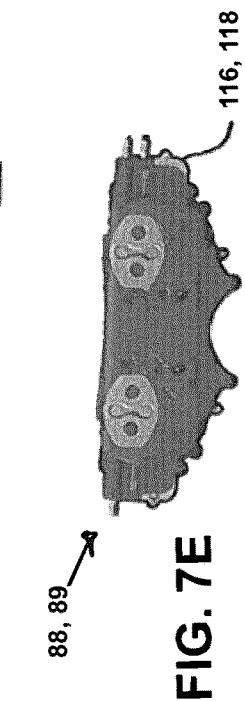
Figure 7A:
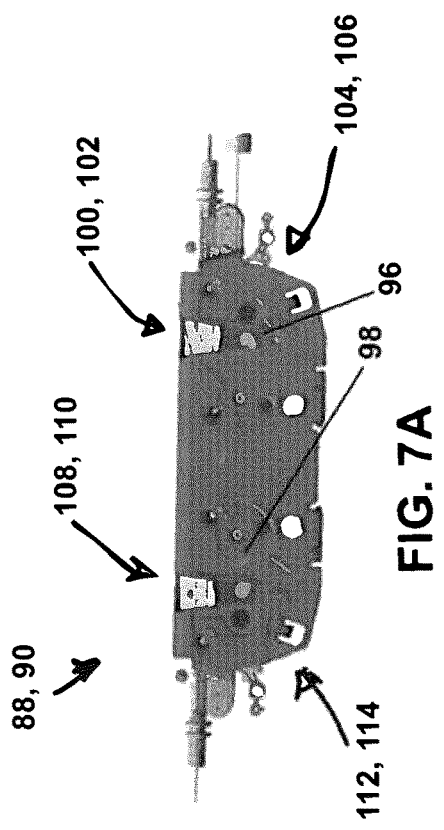
Figure 7B:
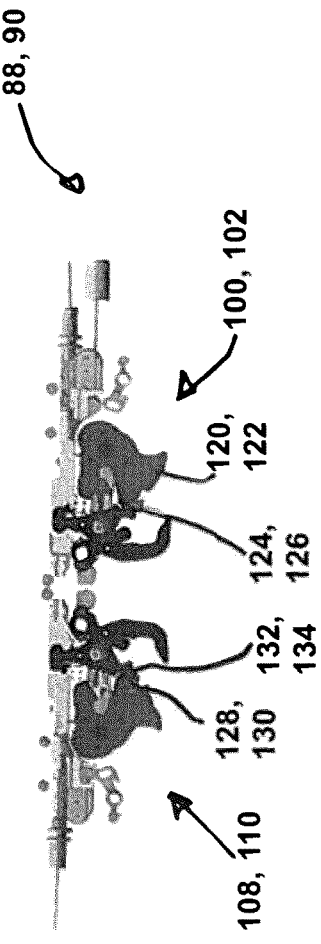

Referring now to FIGS. 7A-7E, each latch assembly 88, 90 includes a primary latch mechanism 100, 102 for the first closure member (e.g., first front door 64 or second front door 66) that has a primary actuation group 104, 106 operable to control actuation of the first closure member. In addition, each latch assembly 88, 90 includes a secondary latch mechanism 108, 110 for the second closure member (e.g., first rear door 74 or second rear door 76) that has a secondary actuation group 112, 114 operable to control actuation of the second closure member. For the first side latch assembly 88, a first primary latch mechanism 100, a first primary actuation group 104, a first secondary latch mechanism 108 and first secondary actuation group 112 are all integrated into a single first side housing 116 (FIG. 7E). Likewise, for the second side latch assembly 90, a second primary latch mechanism 102, a second primary actuation group 106, a second secondary latch mechanism 110 and second secondary actuation group 114 are all integrated into a single second side housing 118 (FIG. 7E).

The primary actuation group 104, 106 of each primary latch mechanism 100, 102 includes a primary ratchet 120, 122 moveable between a striker release position and a striker capture position. A primary pawl 124, 126 is moveable between a ratchet holding position for holding the primary ratchet 120, 122 in its striker capture position and a ratchet releasing position for permitting the primary ratchet 120, 122 to move to its striker release position. The primary actuation group 104, 106 is operable for moving the primary pawl 124, 126 between its ratchet holding position and its ratchet release position. Similarly, the secondary actuation group 112, 114 of the secondary latch mechanism 108, 110 includes a secondary ratchet 128, 130 moveable between a striker release position and a striker capture position. A secondary pawl 132, 134 is moveable between a ratchet holding position for holding the secondary ratchet 128, 130 in its striker capture position and a ratchet releasing position for permitting the secondary ratchet 128, 130 to move to its striker release position. The secondary actuation group 112, 114 is operable for moving the secondary pawl 132, 134 between its ratchet holding position and its ratchet release position.

Each latch assembly 88, 90 additionally includes a respective controller unit 136, 138 that is also integrated into the respective housing 116, 118 (e.g., mounted to a respective printed circuit board 140, 142 having a respective connector 144, 146 extending from the respective housing 116, 118 as shown in FIG. 7C). The controller unit 136, 138 is therefore disposed in the housing 116, 118. The controller unit 136 is coupled to the primary and secondary actuation groups 104, 112 and the controller unit 138 is coupled to the primary and secondary actuation groups 106, 114, with each controller unit 136, 138 being configured to determine which of the respective primary actuation group 104, 106 and the respective secondary actuation group 112, 114 to actuate. Accordingly, the controller unit 136 controls actuation of at the primary actuation group 104 and the secondary actuation group 112 independently from one another, while the controller unit 138 controls actuation of at the primary actuation group 106 and the secondary actuation group 114 independently from one another.

In more detail, the first side latch assembly 88 has a first side controller unit 136 coupled to the first primary and first secondary actuation groups 104, 112 and is configured to control actuation of at least one of the first primary actuation group 104 and the first secondary actuation group 112. The second side latch assembly 90 additionally includes a second side controller unit 138 in communication with the first side controller unit 136 and coupled to the second primary and second secondary actuation groups 106, 114 and configured to control actuation of at least one of the second primary actuation group 106 and the second secondary actuation group 114.

Figure 8A:
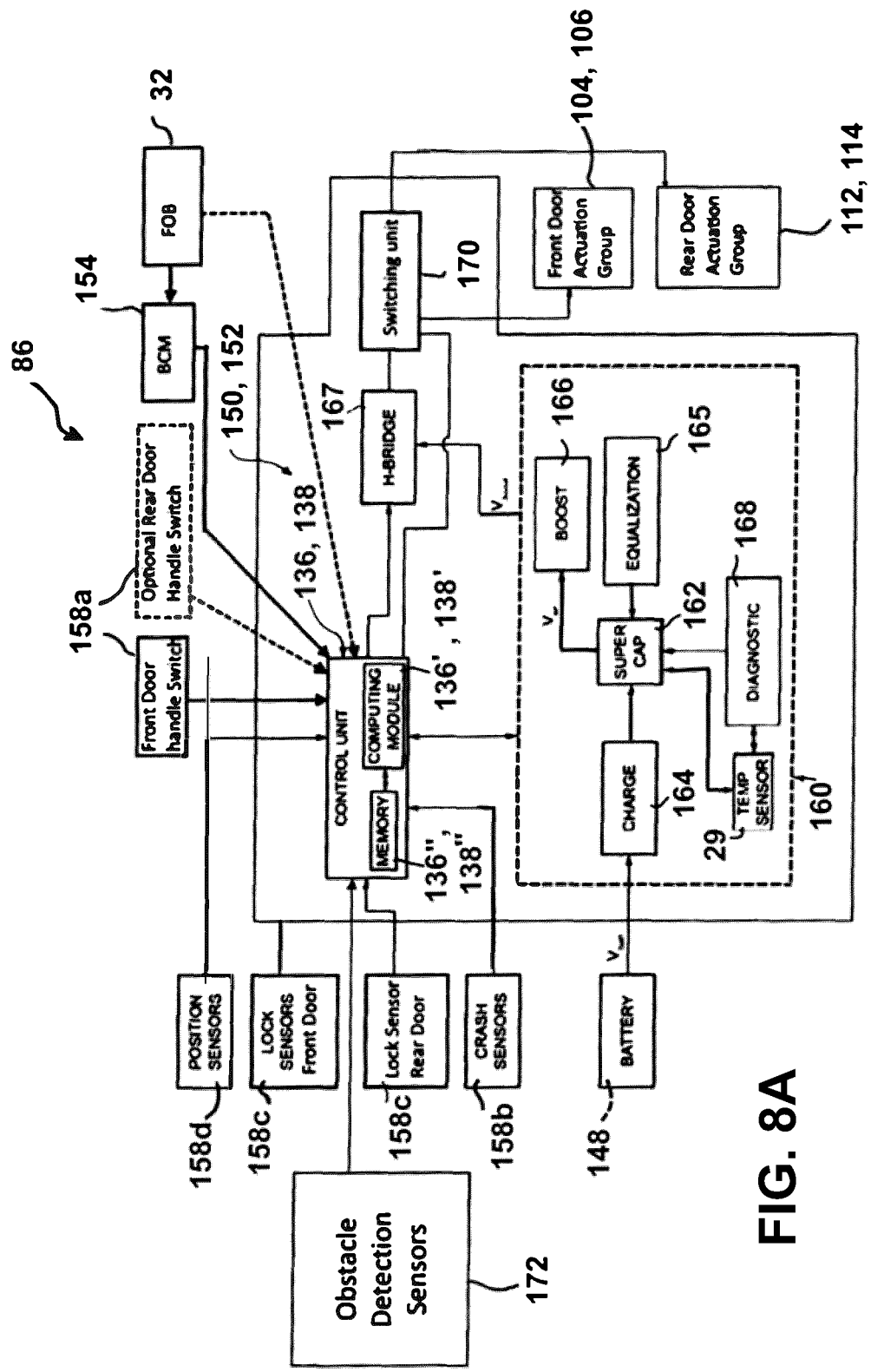
FIG. 8A is a general block diagram of an electronic control circuit of the latch assembly according to aspects of the disclosure.

Referring now to FIG. 8A, the latch assembly 88, 90 of the door system 86 is electrically connected to a main power source 148 of the motor vehicle 50, for example a main battery providing a battery voltage Vbatt of 12 volts, through an electrical connection element, for example a power cable (the main power source 148 may equally include a different source of electrical energy within the motor vehicle 50, for example an alternator). Each actuation group 104, 106, 112, 114 includes an electric motor (not shown), operable to control actuation of the respective closure member 64, 66, 74, 76 while using power from the main power source 148. Each pawl 124, 126, 132, 134 is driven by a respective one of the electric motors so as to move between an engaged position (ratchet holding) and a non-engaged position (ratchet releasing).

Each latch assembly 88, 90 is controlled by a respective electronic control circuit 150, 152 that includes the respective controller units 136, 138. In more detail, each controller unit 136, 138 comprises a microcontroller, microprocessor or analogous computing module 136', 138' and an embedded memory 136", 138", for example a non-volatile or random access memory, coupled to the computing module 136', 138', storing suitable programs and computer instructions (for example in the form of a firmware). It is recognized that the controller unit 136, 138 may alternatively comprise a logical circuit of discrete components to carry out the functions of the computing module 136', 138' and memory 136", 138". So, the electronic control circuit 150 is coupled to the electric motor of each actuation group 104, 112 and provides driving signals thereto, and the electronic control circuit 152 is coupled to the electric motor of each actuation group 106, 114 and provides driving signals thereto.

The electronic control circuit 150, 152 is electrically coupled to a vehicle main management unit (also known as main BCM or "body control module") 154, which is configured to control general operation of the motor vehicle 50, via a data bus 156, so as to exchange signals, data, commands and/or information.

Moreover, as also shown in FIG. 8A, the electronic control circuit 150, 152 is (directly, and/or indirectly via the vehicle management unit 154) coupled to several different sensors 158 (shown schematically) of the motor vehicle 50, such as: handle-reading sensors or switches 158a (which read actuation of external and/or internal handles of the closure members), crash sensors 158b, lock switch sensors 158c, and the like; conveniently, the electronic control circuit 150, 152 also receives feedback information about the latch actuation from position sensors 158d, such as Hall sensors, configured to detect the operating position, for example of the ratchet 120, 122, 128, 130 and/or pawl 124, 126, 132, 134.

The electronic control circuit 150, 152 is also coupled to the main power source 148 of the motor vehicle 50, so as to receive the battery voltage Vbatt; the electronic control circuit 150, 152 is thus able to check if the value of the battery voltage Vbatt decreases below a predetermined threshold value, to promptly determine if an emergency condition (when a backup energy source may be needed) occurs.

Each electronic control circuit 150, 152 includes an embedded and integrated backup energy source 160, which is configured to supply electrical energy to the actuation group 104, 106, 112, 114 and latch electric motor, and to the same electronic control circuit 150, 152, in case of failure or interruption of the main power supply from the main power source 148 of the motor vehicle 50.

According to an aspect of the present disclosure, the backup energy source 160 includes a group of low voltage supercapacitors 162 (hereinafter supercap group 162), as an energy supply unit (or energy tank) to provide power backup to the latch assembly 88, 90, even in case of power failures. Supercapacitors may include electrolytic double layer capacitors, pseudocapacitors or a combination thereof.

Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

The backup energy source 160 further includes a charge module 164, an equalization module 165, and a boost module 166. The charge module 164 is electrically coupled to the supercap group 162 and is configured to recharge, starting from the battery voltage Vbatt, whenever power from the main power source 148 is available, the supercap group 162, so that the same supercap group 162 may offer a full energy storage for emergency situations and any leakage currents are compensated.

The equalization module 165 is electrically coupled to the supercap group 162, and is configured to ensure that supercapacitor cells have a desired cell voltage value, in particular a same cell voltage value during operation (to achieve a balanced operating condition). The equalization module 165 also avoids that supercapacitor cells have a cell voltage over a maximum desired cell voltage level, protecting the supercapacitors against overcharging.

The boost module 166 receives at its input the supercap voltage Vsc generated by the supercap group 162, and is configured to boost, that is to increase, its value up to automotive standard voltages (for example 9 V-16 V), and to provide enough output current capability to drive standard automotive electric motors, such as the electric motor of the latch assembly 88, 90. Indeed, the supercap voltage Vsc may be too low to provide an effective back-up power source to directly drive the electric motor in emergency situations, like lost or insufficient power supply from main power source 148 of the motor vehicle 50.

The boost module 166 thus provides at its output (that is also the output of the backup energy source 160) a boosted voltage Vboost, as a function of the supercap voltage Vsc. The boosted voltage Vboost is then received by an output module of the electronic control circuit 150, 152, for example including an integrated H-bridge module 167, whose output drives the electric motor of the latch assembly 88, 90.

The backup energy source 160 further includes a diagnostic module 168, which is operatively coupled to the supercap group 162 and is configured to monitor the health status of the supercapacitors during the charging process and based on the same charging process, by measuring their voltage value, capacitance value, and internal equivalent resistance (DCR—Direct Current Resistance), for example.

A temperature sensor 169 is configured to monitor the operating temperature of the supercap group 162, and it is coupled to the diagnostic module 168 to provide the detected temperature information; for example, temperature sensor 169 may include an NTC (Negative Temperature Coefficient) resistor arranged in the proximity of the supercap group 162.

The diagnostic module 168 is operatively coupled to the controller unit 136, 138, to provide diagnostic information thereto, for example including the value of the supercap voltage Vsc. In a possible embodiment, not shown, the diagnostic module 28 may be implemented in the controller unit 136, 138, as a diagnostic routine run by the microprocessor or microcontroller thereof.

Figure 8B:
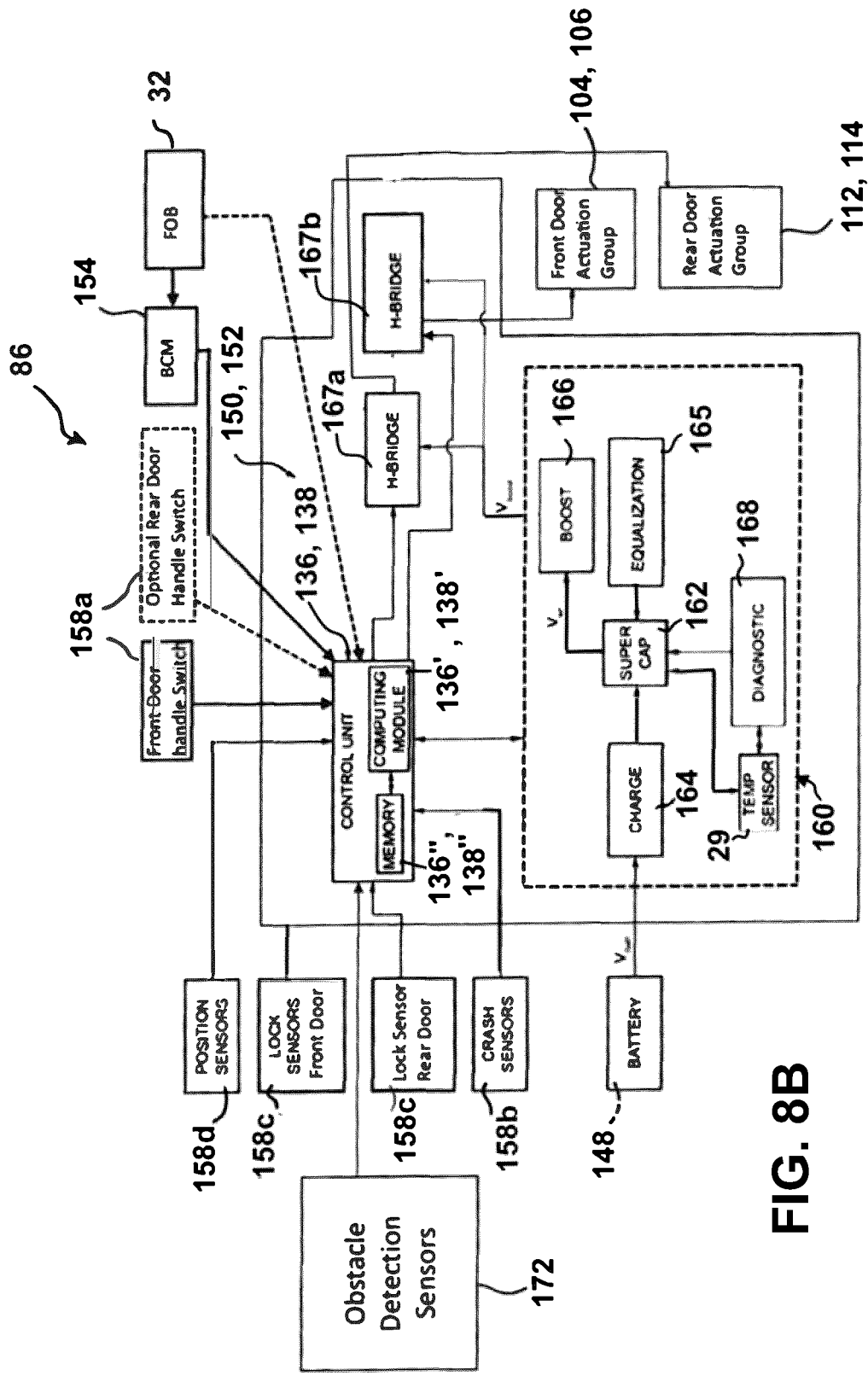
FIG. 8B is a general block diagram of an electronic control circuit of the latch assembly according to aspects of the disclosure.
Figures 8C, 8D, 8E:
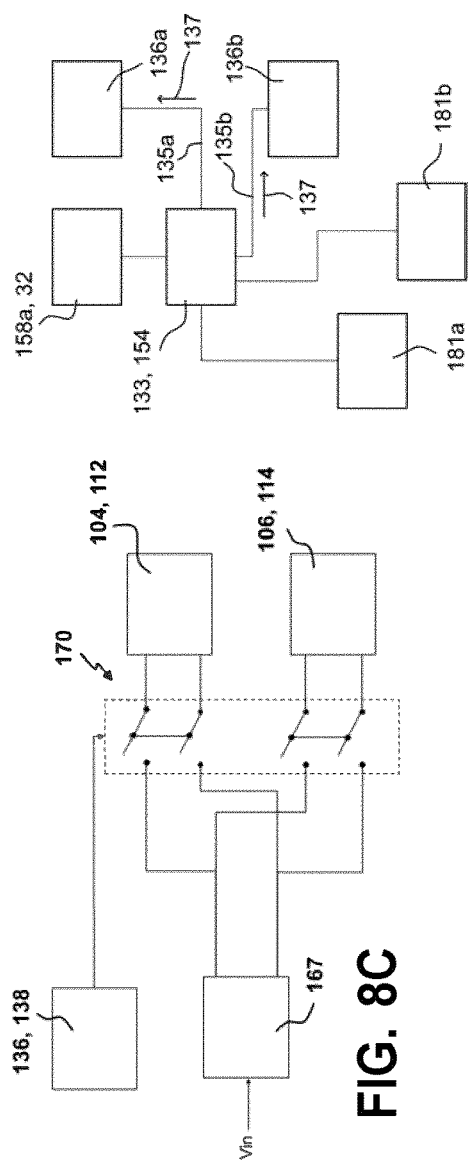
FIG. 8C is a circuit diagram of a switching unit of FIG. 8A, in accordance with aspects of the present disclosure.
FIG. 8D is a system block diagram of an exemplary control system fora B-pillar less door configuration with upper and lower latch assemblies according to aspects of the disclosure.
FIG. 8E is a system block diagram of another exemplary control system for a B-pillar less door configuration with upper and lower latch assemblies according to aspects of the disclosure.

Each electronic control circuit 150, 152 can further include a switching unit 170 coupled to the controller unit 136, 138 (e.g., to an output of the H-bridge module 167) and to the primary and secondary actuation groups 104, 106, 112, 114. Thus, the controller unit 136, 138 is further configured to control the switching unit 170 to actuate and control actuation of the at least one of the primary actuation group 104, 112 and the secondary actuation group 106, 114. An illustrative circuit diagram of switching unit 170 is shown in FIG. 8C. Switching unit 170 may be configured to control flow of power to either of the primary actuation group 104, 112 and the secondary actuation group 106, 114 individually, for example either being supplied power separately, or together, for example both being controlled at the same time. FIG. 8A shows a configuration whereby a single H-bridge 167 connected to each primary actuation group 104, 112 and the secondary actuation group 106, 114 via the switching unit 170, where controller 136, 138 is adapted to control switching of signal lines outputted from the single H-bridge 167 using the switching unit 170 as shown in FIG. 8C. The switching unit 170 is shown illustratively as two double pole double through switches each controllable by the controller 136, 138 for selectively connecting or disconnecting the single H-bridge 167 with the primary actuation group 104, 112 and the secondary actuation group 106, 114. In an alternative configuration as shown in FIG. 8B, switching unit 170 is not provided but rather two H-bridges 167a, b each controllable by the controller 136, 138 are each separately connected to an associated primary actuation group 104, 112 or the secondary actuation group 106, 114 where power is supplied to either or both associated primary actuation group 104, 112 or the secondary actuation group 106 by the controller 136, 138 controlling each of the H-bridges 167a, b.

Now referring to FIGS. 8D and 8F, there is illustrated one possible circuit configuration of a dual door pillar-less door system 86 for a motor vehicle 50 with a front door 64 and a rear door 74, the dual door pillar-less door system 86 including a first latch assembly 88, for example an upper latch assembly 88b including a first primary latch mechanism 100 for the front door 64 and having a first primary actuation group 104 operable to control actuation of the front door 64, and a secondary latch mechanism 108 for the rear door 74 and having a first secondary actuation group 112 operable to control actuation of the rear door 74, and a first controller unit 136a coupled to the first primary actuation group 104 and to the first secondary actuation group 112 and configured to control actuation of at least one of the first primary actuation group 104 and the first secondary actuation group 112. The dual door pillar-less door system 86 may further include a second latch assembly 88a, for example as a lower latch assembly 88a, including a second primary latch mechanism 102 for the front door 64 and having a second primary actuation group 106 operable to control actuation of the front door 64 and a second secondary latch mechanism 110 for the rear door 74 and having a second secondary actuation group 114 operable to control actuation of the rear door 74 and a second controller unit 136b coupled to the second primary actuation group 106 and the second secondary actuation group 114 and configured to control actuation of at least one of the second primary actuation group 106 and the second secondary actuation group 114. The first controller unit 136a and the second controller unit 136b operate in synchronicity to control actuation of the front door 64 independently from actuation of the rear door 76, and vice versa. For example the first controller unit 136a and the second controller unit 136b may communicate and coordinate with each other, over a communication link 135a, 135b such as a dedicated wired connection with one another (see FIG. 8D), or over a communication vehicle bus (see FIG. 10 for example), such as a LIN or CAN network as examples, to control second primary actuation group 106 for releasing only the front door 64. For example the first controller unit 136a and the second controller unit 136b may communicate and coordinate with each other, over a communication channel such as a dedicated wired connection with one another, or over a communication vehicle bus, such as a LIN or CAN network as examples, to control the first secondary actuation group 112 together with the second secondary actuation group 114 for releasing only the rear door 66. Synchronizing the control of the first primary actuation group 104 together with the second primary actuation group 106 for releasing only the front door 64 may be provided when each of the first controller unit 136a associated with the first latch assembly 88a and the second controller unit 136b associated with the second latch assembly 88b each receive a closure member command signal, such as a closure member opening command, over signal communication lines 135a, 135b connecting each of the first controller unit 136a and the second controller unit 136b to a centralized control module 133, such as a Body Control Module 154, or other control node as shown in FIG. 8D. Such a centralized control module 133, 154 may be provided on the vehicle body 52, or within one of the front and rear doors 64, 75. The centralized control module 133 may be in signal communication with a handle switch 158a, a body control module 154 if not functioning as a Body Control module, and a key fob 32, or other interface device, and is configured to issue a command 137 over the signal lines 135a, 135b to the first controller unit 136a and the second controller unit 136b. Each of the first controller unit 136a and the second controller unit 136b may receive the command signal 137 simultaneously for ensuring synchronized release of each of the lower latch assembly 88a and the upper latch assembly 88b. For example the first controller unit 136a and the second controller unit 136b may communicate and be coordinated with each other over a communication channel such as a dedicated wired connection with one another, or over a communication vehicle bus, such as a LIN or CAN network as examples, to control the first primary actuation group 104 of an upper latch assembly together with the second primary actuation group 106 of a lower latch assembly for releasing only the front door 64.

For example the first controller unit 136a and the second controller unit 136b may communicate and coordinate with each other, over a communication channel such as a dedicated wired connection with one another, or over a communication vehicle bus, such as a LIN or CAN network as examples, to control the first secondary actuation group 112 of an upper latch assembly together with the second secondary actuation group 114 of a lower latch assembly for releasing only the rear door 74. Synchronizing the control of the first primary actuation group 104 together with the second primary actuation group 106 for releasing only the front door 64 may be provided when each of the first controller unit 136a associated with the lower latch assembly 88a and the second controller unit 136b associated with the upper latch assembly 88b receive a closure member command signal 137, such as a closure member opening command, over signal communication lines 135a, b connecting each of the first controller unit 136a and the second controller unit 136b to a centralized control module 133, such as a Body Control Module 154 as shown with reference to FIGS. 8D and 8F. FIG. 8F illustrates the electrical signal lines connecting the first controller unit 136a and the second controller unit 136b to the centralized control module running on the body 52 of the vehicle 50 without having to run through the door 64, 74 or harness bridging the body 52 to the door 64, 74 for electrical wiring. Centralized control module may be in signal communication with a handle switch 158a, a body control module 154 if not functioning as a Body Control module, and a key fob 32, and may be configured to issue or transmit a command over the signal lines. Each of the first controller unit 136a and the second controller unit 136b may receive the command signal simultaneously for ensuring synchronized release of each of the lower latch assembly 88a and the upper latch assembly 88b. Synchronizing the control of the first primary actuation group 104 together with the second primary actuation group 106 for releasing only the front door 64 may be provided when one of the first controller unit 136a associated with the first latch assembly 88a and the second controller unit 136b associated with the second latch assembly 88b acting as a master controller which receives a closure member command signal, such as a closure member opening command, over signal communication line or bus 135c connecting only one of the first controller unit 136a and the second controller unit 136b to a centralized control module 133, 154, such as a Body Control Module, as shown with reference to FIGS. 8E and 8G. First controller unit 136a is shown in FIG. 8E as acting as a master controller while second controller unit 136b is shown acting as a slave controller. Centralized control module 133 may be in signal communication with a handle switch 158a, a body control module 154 if not functioning as a Body Control module 154, or a key fob 32, as examples and be configured to issue a command 137 over the signal line 135c. One of first controller unit 136a acting as a master controller may receive the command signal 137 and transmit a sub-command signal 139 to other one of the one of the first controller unit 136a associated with the first latch assembly 88a and the second controller unit 136b associated with the second latch assembly 88b acting as a slave controller for ensuring synchronized release of the lower latch assembly 88a and the upper latch assembly 88b, such as for simultaneous release of the lower latch assembly 88a and the upper latch assembly 88b. First controller unit 136a and second controller unit 136b may be connected over a dedicated signal line 135d, or over a shared vehicle bus.

Figure 8H:
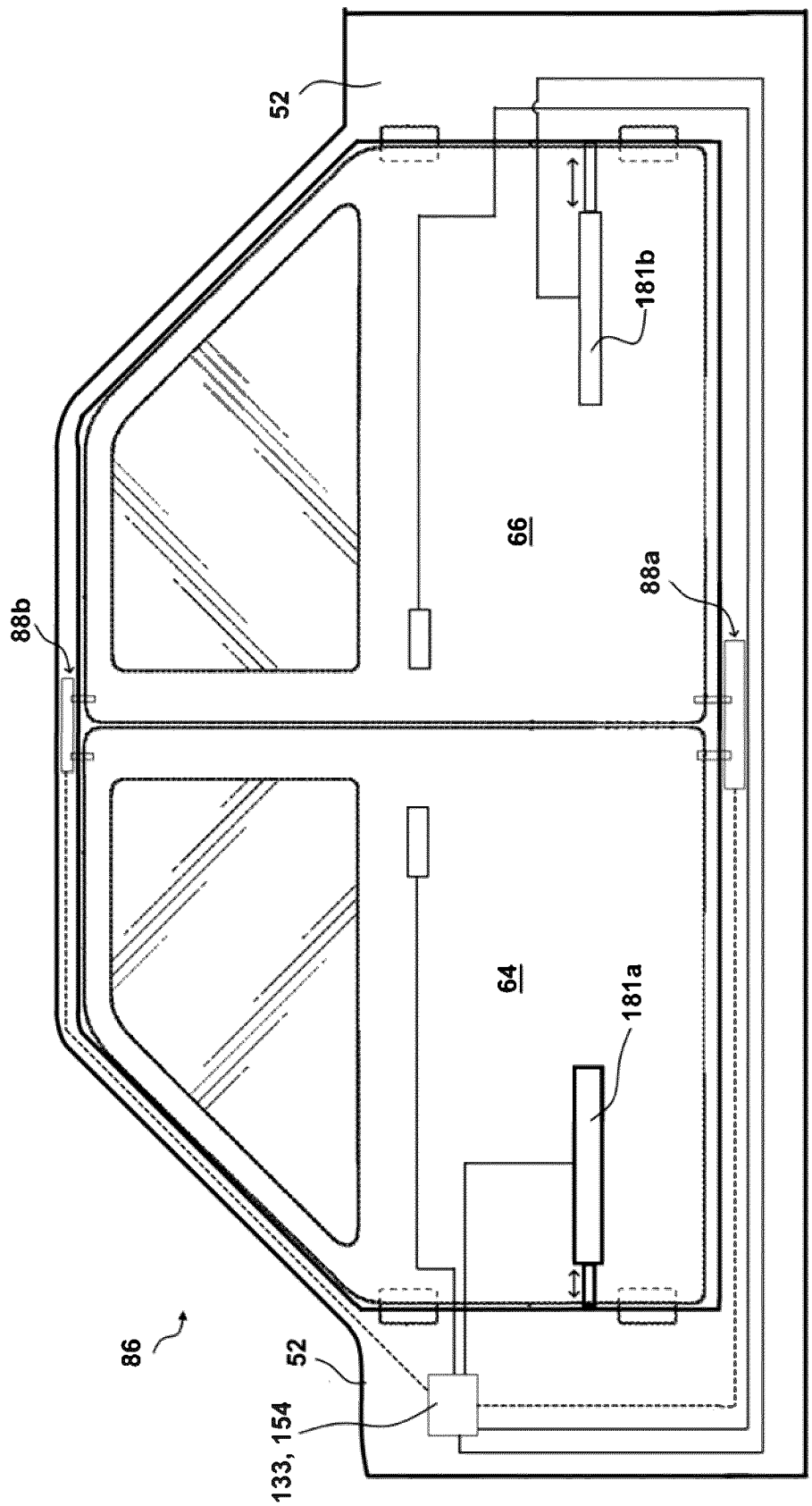
FIG. 8H depicts an illustrative wiring diagram for the control system of FIG. 8F for a B-pillar less door configuration with door mounted power actuators, according to aspects of the disclosure.
Figure 8I:
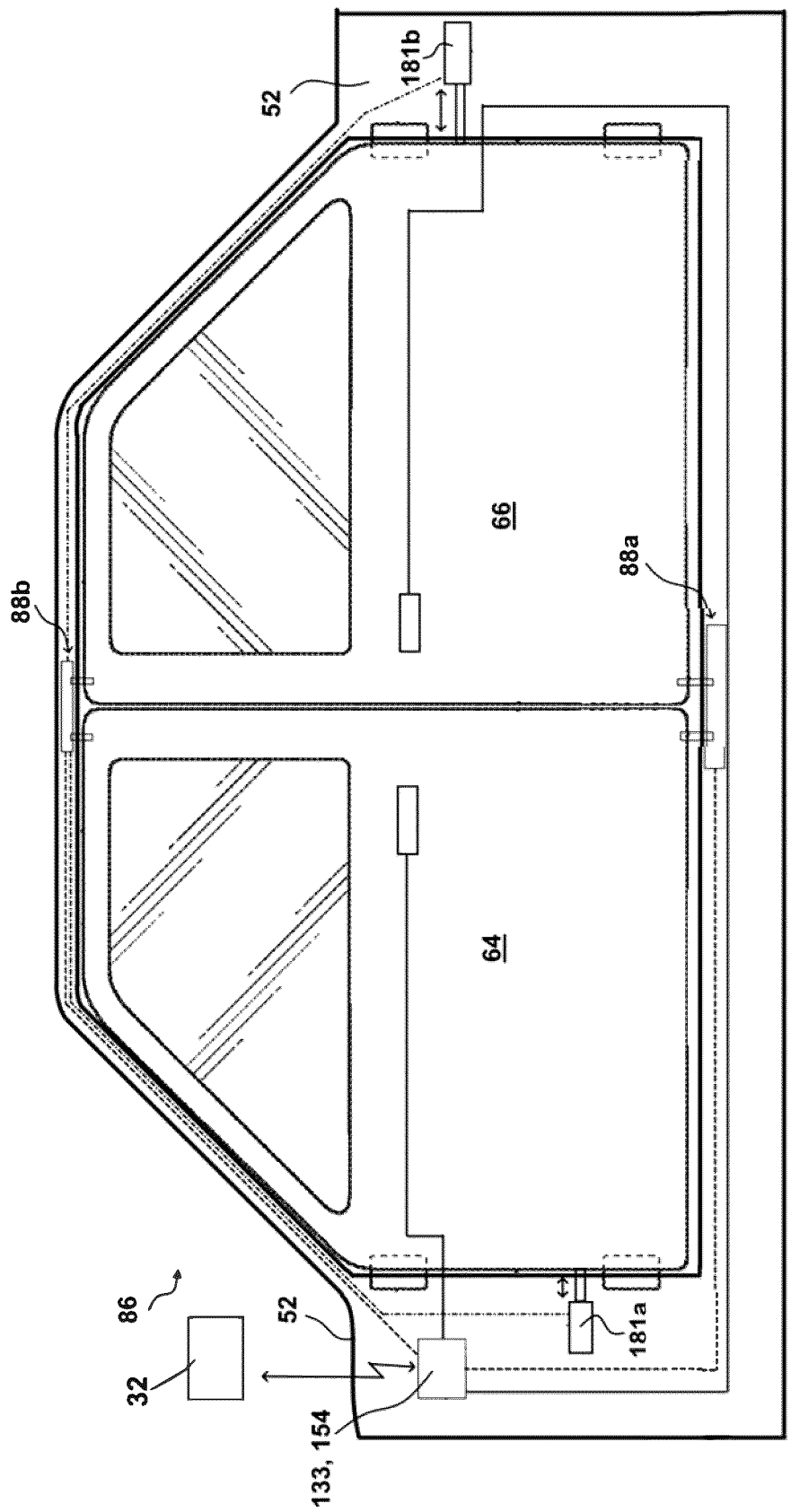
FIG. 8I depicts an illustrative wiring diagram for the control system of FIG. 8G for a B-pillar less door configuration with body mounted power actuators, according to aspects of the disclosure.
Figure 10:
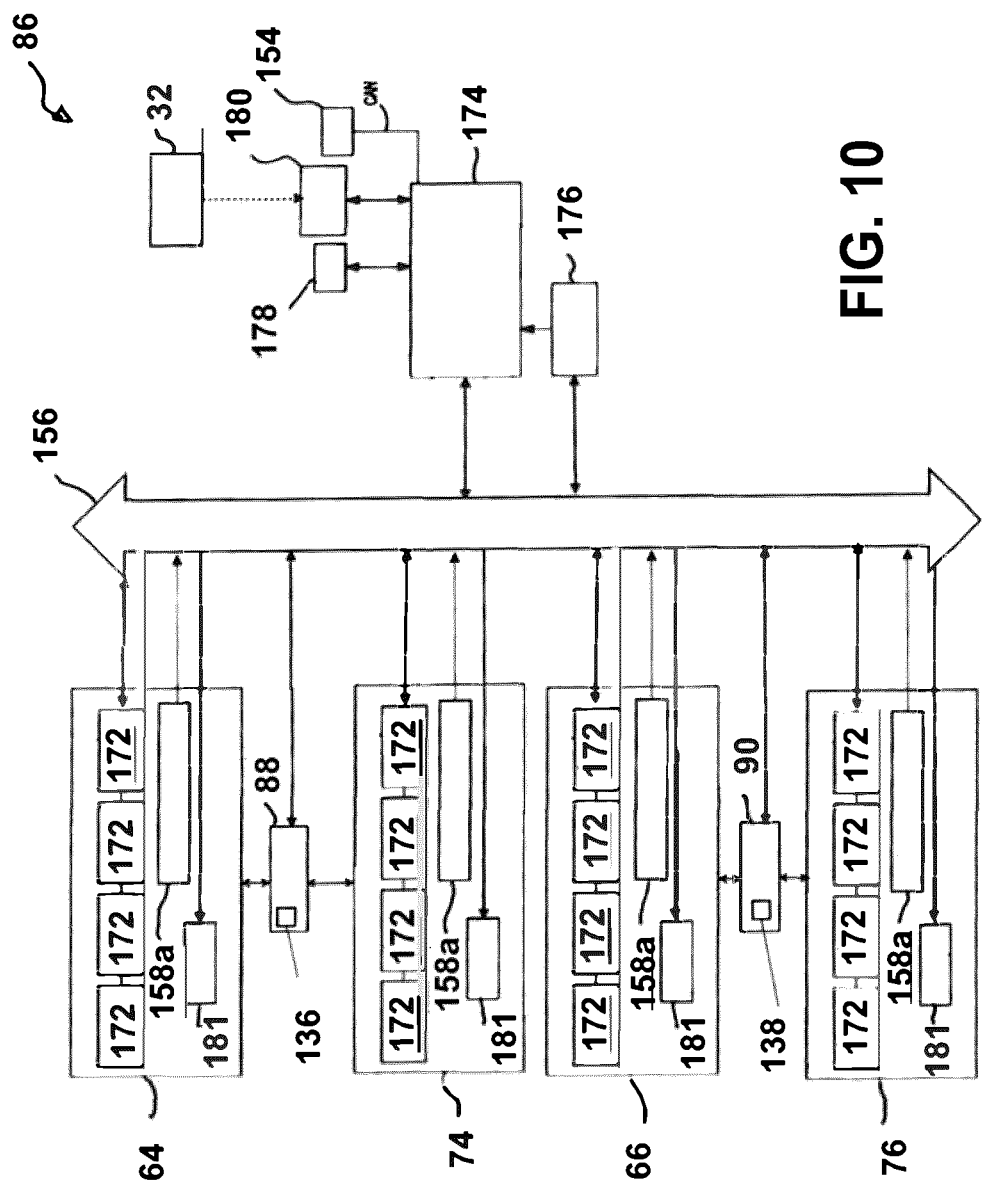
Figure 12D:
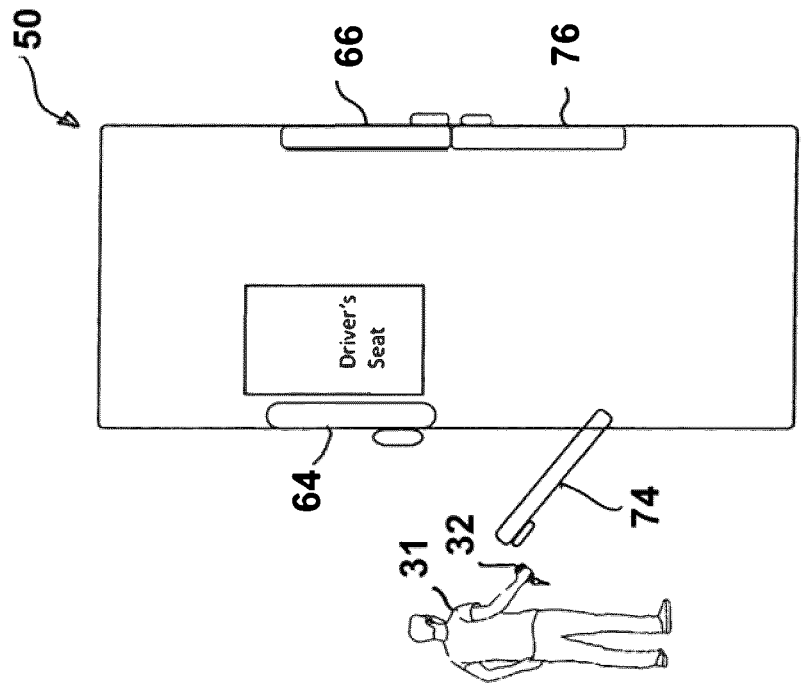
Figure 12C:
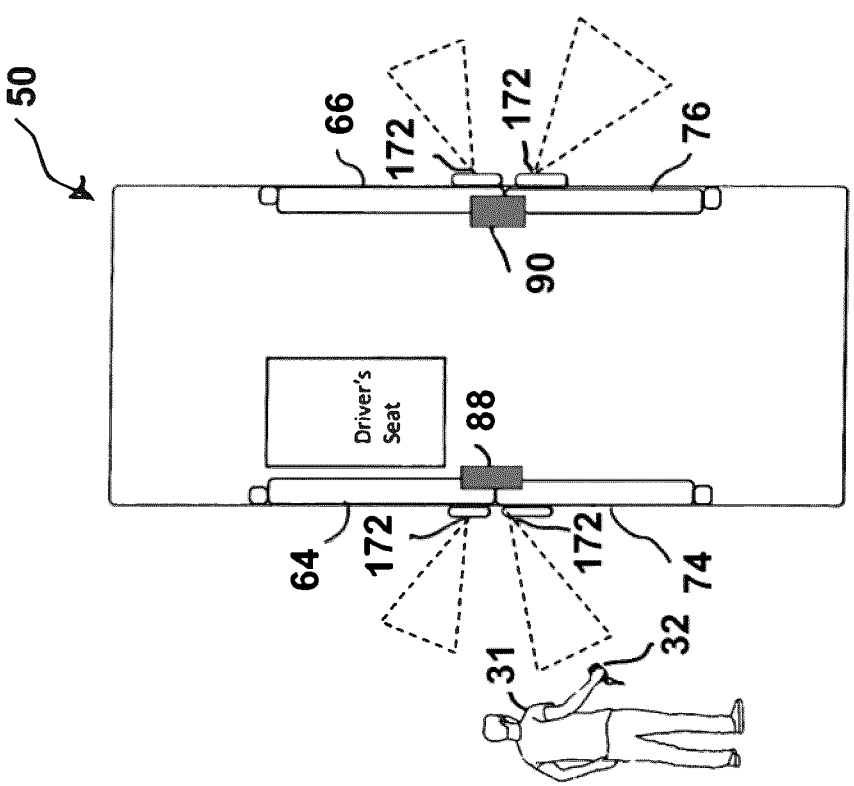

Now referring to FIGS. 8H and 8I, in addition to FIG. 8D, the dual door pillar-less door system 86 may further include a first motor 181a associated with the front door 64 to move the front door 64 and a second motor 181b associated with rear door 74 to move the rear door, the first motor 181a, the second motor 181b, the first controller unit 136a and the second controller unit 136b are electrically connected to a master controller, such as a Body Control Module, or other centralize control module. First motor 181a, the second motor 181b, the first controller unit 136a and the second controller unit 136b may be electrically connected to a master controller, such as a Body Control Module, or other centralize control module using a vehicle bus such as is shown in FIG. 10, or using dedicated wires or wireless communication paths, or a combination thereof. First motor 181a and second motor 181b may be body mounted actuators as shown in FIG. 8I, but may also be provided within the doors 64, 66 (or door mounted) as shown in FIG. 10 and FIG. 8H. In a combination of first latch assembly 88a and the second latch assembly 88b and the first motor 181a and second motor 181b all being body mounted as shown in FIG. 8I the weight of the doors 64, 74 and the wiring complexity through a wiring harness to the doors 64, 74 may be reduced. FIGS. 8H and 8I each show first motor 181a and second motor 181b configurations with configuration associated with control system configurations shown in respective FIGS. 8F and 8G, however, first motor 181a and second motor 181b may be combined with any of the control system configurations described herein and are not limited to arrangements shown in FIGS. 8H and 8I. In the above configurations, the motors 181a, 181b may be associated with different control arrangements, for example both the motors may be controlled by one of the latch assemblies, 88a, 88b, for example one of the latch assemblies 88a, 88b adapted as a master controller as described herein above.

Figure 9B:
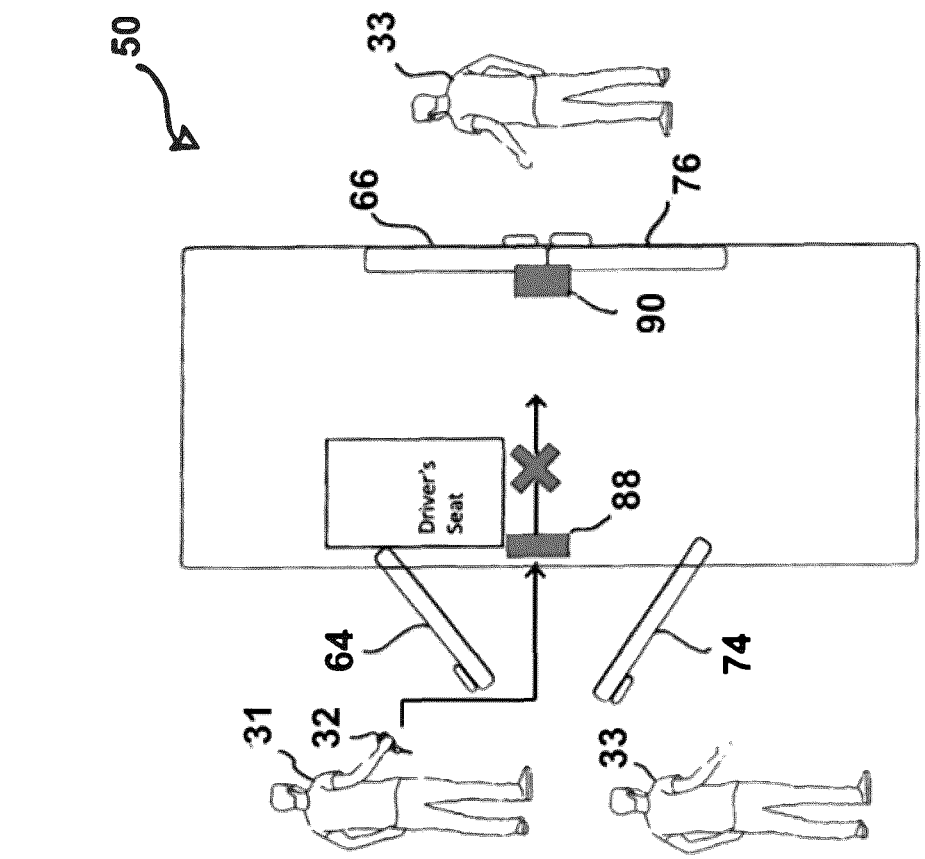
FIGS. 9A-9D depict operation of the door system using the latch assembly on each of a first side and a second side of the motor vehicle according to aspects of the disclosure.
Figure 9A:
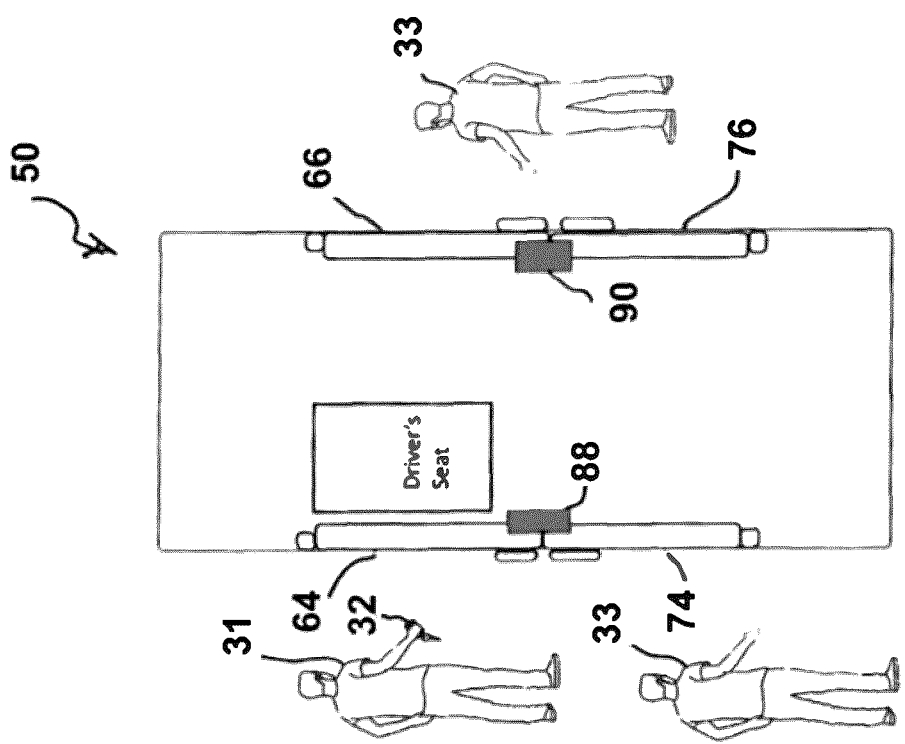
Figure 9D:
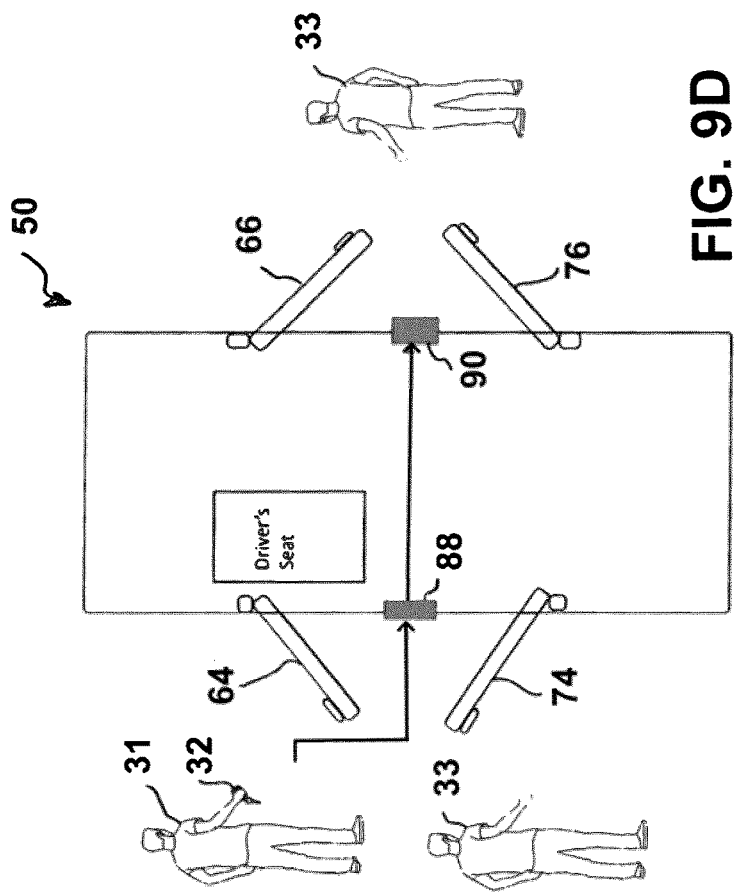
Figure 9C:
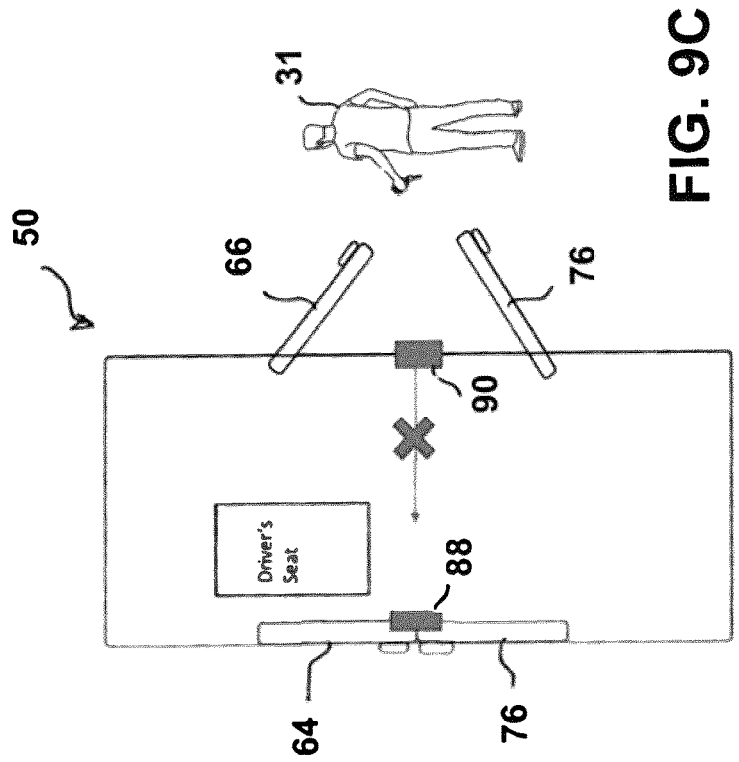

Operation of the door system 86 is shown in FIGS. 9A-9D. So, the controller unit 136, 138 is configured to receive at least one closure member opening command from an input source selected from an actuation mechanism, also referred to as input source, such as from a group comprising a handle switch 158a, a body control module 154, or a key fob 32. In more detail, only the controller unit 136, 138 that is on the same side of the vehicle 50 as the person 31 with the key fob 32 (or the side in which the person 31 pulls a handle of the door 64, 66, 74, 76 to activate the handle switch 158a) is configured to act on the at least one closure member opening command from the input source. So, as shown in FIG. 9A, the person 31 is on the first side of the vehicle 50, therefore, the first side controller unit 136 controls actuation of both of the first front door 64 and the first rear door 74 on the first side of the vehicle 50 via latch assembly 88, while the second front door 66 and second rear door 76 remain locked or latched via latch assembly 90, as shown in FIG. 9B. Similarly, as shown in FIG. 9C, the person 31 is on the second side of the vehicle 50 opposite the first side. Thus, the second side controller unit 138 controls actuation of both of the second front door 66 and the second rear door 76 via latch assembly 90 on the second side of the vehicle 50, while the first front door 64 and first rear door 74 remain locked or latched via latch assembly 88.

Now referring to FIG. 9D, the controller unit 136, 138 is also configured to determine whether the at least one closure member opening command from the input source includes two closure member commands, such as opening commands, by way of example and without limitation. The controller unit 136, 138 then controls the actuation of both of the first front door 64 and the first rear door 74 on the first side using the first side controller unit 136 or both of the second front door 66 and the second rear door 76 using the second side controller unit 138 on the second side and communicates an opposite side open command to one of the first side controller unit 136 and the second side controller unit 138 in response to determining the at least one closure member opening command from the input source includes two closure member opening commands. The second side controller unit 138 then controls the actuation of both of the second front door 66 and the second rear door 76 in response to receiving the opposite side open command from the first side controller unit 136.

Referring back to FIG. 8A, the door system 86 can additionally include a plurality of obstacle detection sensors 172 in communication with the first side controller unit 136 and the second side controller unit 138. The plurality of obstacle detection sensors 172 are configured to detect an object or a gesture adjacent the first front door 64 and the first rear door 74 and the second front door 66 and the second rear door 76.

As shown in FIGS. 10 and 11, each of the first front door 64, the first rear door 74, the second front door 66, and the second rear door 76 can include more than one of the obstacle detection sensors 172. Specifically in FIG. 9, the obstacle detection sensors 172 in each door 64, 66, 74, 76 communicate over the bus 156 with a central sensor control unit 174 powered by a power source 176. The central sensor control unit 174 is additionally connected to a liquid crystal display (LCD) 178 and communicates with the key fob 32 via a wireless interface 180. Each door 64, 66, 74, 76 also includes a motor 181 used for powered movement of the door 64, 66, 74, 76. Alternatively, in FIG. 10 the obstacle detection sensors 172 in each door 64, 66, 74, 76 communicate with door sensor control units 182 which then communicate over the bus 156. The Body Control Module 154 is powered by the power source 176. The body control module 154 is additionally connected to the liquid crystal display (LCD) 178 and communicates with the key fob 32 via the wireless interface 180. Again, each door 64, 66, 74, 76 also includes the motor 181 used for powered movement of the door 64, 66, 74, 76.

Consequently, as best shown in FIGS. 12A-12D, the first side controller unit 136 is further configured to adjust the control of the actuation of the at least one of the first primary actuation group 104 and the first secondary actuation group 112 based on the detection of the object or the gesture. Similarly, the second side controller unit 138 is further configured to adjust the control of the actuation of the at least one of the second primary actuation group 106 and the second secondary actuation group 114 based on the detection of the object or the gesture.

In more detail, the first side controller unit 136 of the door system 86 is additionally configured to receive at least one closure member opening command from an input source selected from the group comprising a handle switch 158a, a body control module 154, or a key fob 32. The first side controller unit 136 is also configured to determine whether the object or the gesture is adjacent at least one of the first front door 64 or the first rear door 74. The first side controller unit 136 determines which of the first primary actuation group 104 and the first secondary actuation group 112 to actuate based on the at least one closure member opening command from the input source and whether the object or the gesture is adjacent the at least one of the first front door 64 or the first rear door 74.

Similarly, the second side controller unit 138 is configured to receive the at least one closure member opening command from the input source selected from the group comprising the handle switch 158a, the body control module 154, or the key fob 32. In addition, the second side controller unit 138 is configured to determine whether the object or the gesture is adjacent at least one of the second front door 66 or the second rear door 76. The second side controller unit 138 then determines which of the second primary actuation group 106 and the second secondary actuation group 114 to actuate based on the at least one closure member opening command from the input source and whether the object or the gesture is adjacent the at least one of the second front door 66 or the second rear door 76.

Figure 13:
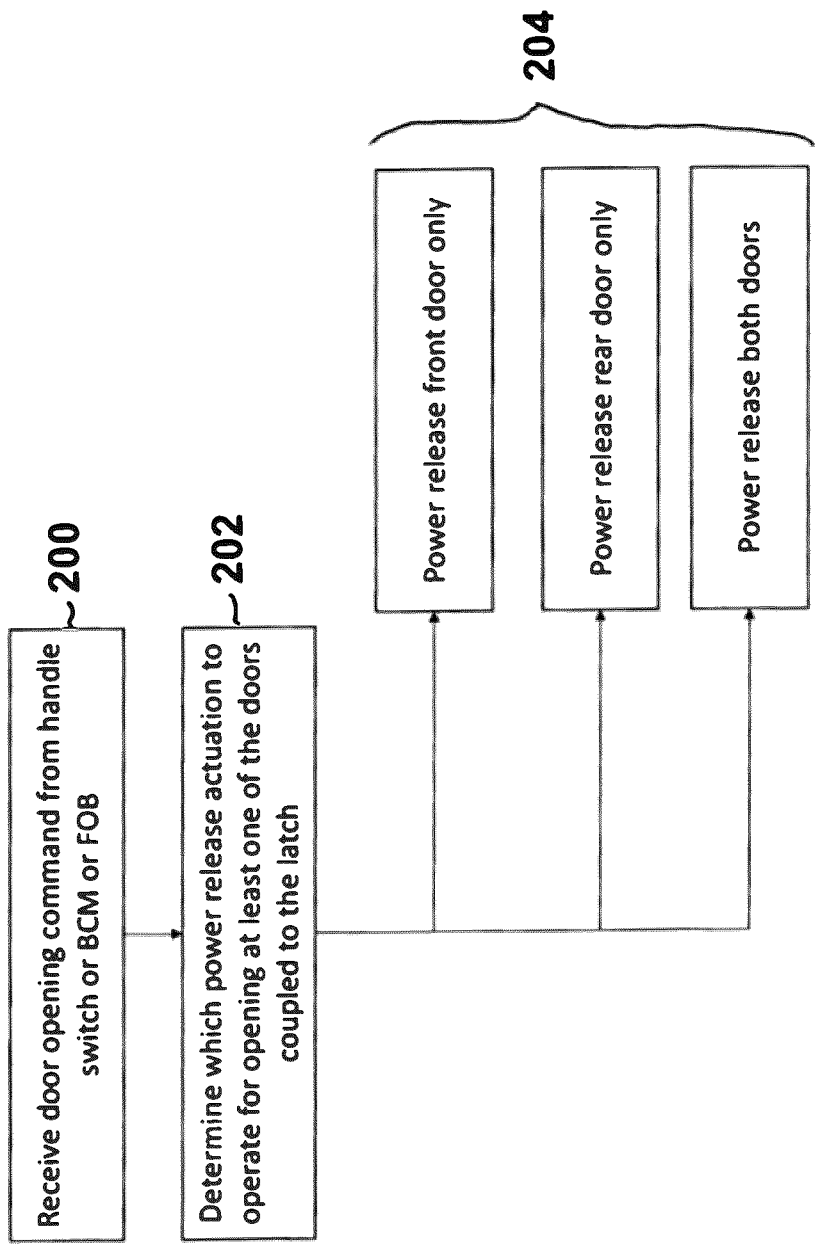
Figure 14:
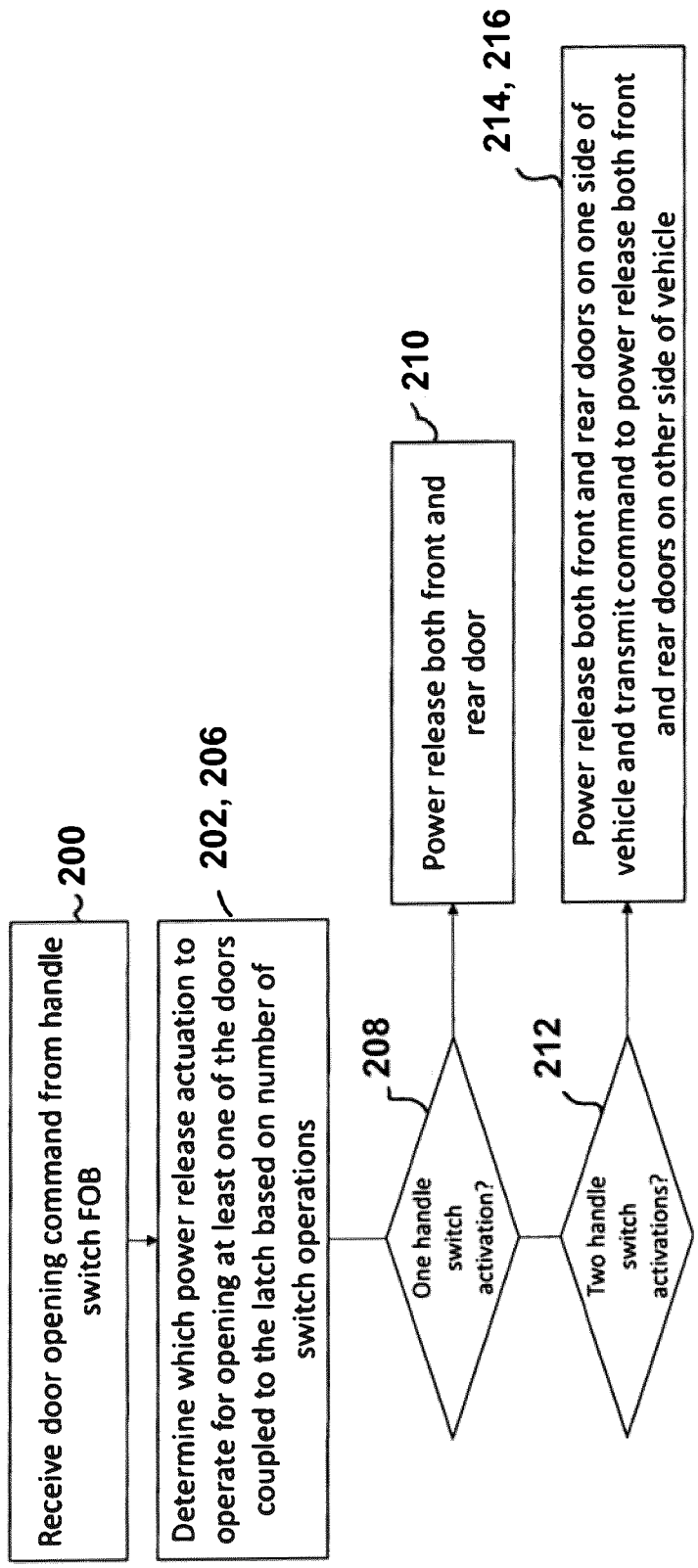

As best shown in FIGS. 13-15, a method of operating a dual door pillar-less door system of a vehicle 50 with a plurality of closure members is also provided. Referring initially to FIG. 13, the method includes the step of 200 receiving at least one closure member 64, 66, 74, 76 opening command from an input source selected from the group comprising a handle switch 158a, a body control module 154, or a key fob 32. The method continues with the step of 202 determining which of a primary actuation group 104, 106 and a secondary actuation group 112, 114 of at least one latch assembly 88, 90 to actuate. The next step of the method is 204 controlling actuation of at least one of the primary actuation group 104, 106 and/or the secondary actuation group 112, 114 of the at least one latch assembly 88, 90 based on the determination of which of the primary actuation group 104, 106 and/or the secondary actuation group 112, 114 to actuate.

As discussed above, the plurality of closure members can include the first front door 64, the first rear door 74, the second front door 66, and the second rear door 76. The door system 86 can further include the plurality of obstacle detection sensors 172 configured to detect an object or a gesture adjacent the first front door 64 and the first rear door 74 and the second front door 66 and the second rear door 76. Thus, as best shown in FIG. 14, the method further includes the step of 206 detecting the object or the gesture adjacent the first front door 64 and the first rear door 74 and the second front door 66 and the second rear door 76.

Consequently, the method also includes the step of 208 determining whether the at least one closure member opening command from the input source includes one closure member opening command. The method proceeds by 210 controlling the actuation of both of the first front door 64 and the first rear door 74 using a first side controller unit 136 on a first side of the vehicle 50 or both of the second front door 66 and the second rear door 76 using a second side controller unit 138 on a second side of the vehicle 50 opposite the first side based on the detecting the object or the gesture adjacent the first front door 64 and the first rear door 74 and the second front door 66 and the second rear door 76 in response to determining the at least one closure member opening command from the input source includes one closure member opening command. The next step of the method is 212 determining whether the at least one closure member opening command from the input source includes two closure member opening commands. Next, the method continues with the step of 214 controlling the actuation of both of the first front door 64 and the first rear door 74 on the first side using the first side controller unit 136 or both of the second front door 66 and the second rear door 76 using a second side controller unit 138 on the second side and communicating an opposite side open command to one of the first side controller unit 136 and the second side controller unit 138 in response to determining the at least one closure member opening command from the input source includes two closure member opening commands. The method also includes the step of 216 controlling the actuation of both of the second front door 66 and the second rear door 76 using the second side controller unit 138 in response to receiving the opposite side open command from the first side controller unit 136.

As best shown in FIG. 15 and as indicated above, the method includes the step of 218 determining whether the at least one closure member opening command from the input source includes one closure member opening command. The method proceeds by 220 controlling the actuation of the first front door 64 using a first side controller unit 136 on a first side of the vehicle 50 or actuation of the second front door 66 using a second side controller unit 138 on a second side of the vehicle 50 opposite the first side based on the detecting the object or the gesture adjacent the first front door 64 and the first rear door 74 and the second front door 66 and the second rear door 76 in response to determining the at least one closure member opening command from the input source includes one closure member opening command. The next step of the method is 222 determining whether the at least one closure member opening command from the input source includes two closure member opening commands. Then, the method continues with the step of 224 controlling the actuation of the first front door 64 and the first rear door 74 using the first side controller unit 136 on the first side of the vehicle 50 or the second front door 66 and the second rear door 76 using the second side controller unit 138 on the second side of the vehicle 50 in response to determining the at least one closure member opening command from the input source includes two closure member opening commands. Next, 226 determining whether the at least one closure member opening command from the input source includes three closure member opening commands. The method continues with the step of 228 controlling the actuation of both of the first rear door 74 and the first rear door 74 on the first side of using the first side controller unit 136 or both of the second front door 66 and the second rear door 76 using a second side controller unit 138 on the second side and communicating an opposite side open command to one of the first side controller unit 136 and the second side controller unit 138 in response to determining the at least one closure member opening command from the input source includes three closure member opening commands. The method also includes the step of 230 controlling the actuation of both of the first front door 64 and the first rear door 74 using the first side controller unit 136 or both of the second front door 66 and both of the second rear door 76 using the second side controller unit 138 in response to receiving the opposite side open command from the first side controller unit 136.

Now referring to FIG. 16, there is illustrated a method 999 of operating a dual door pillar-less door system for a motor vehicle with a front door and a rear door, the method including controlling a first primary actuation group of an upper latch assembly associated with the front door 1000; controlling a second primary actuation group of a lower latch assembly associated with the front door in tandem with controlling the first primary actuation group 1002; controlling a first secondary actuation group of an upper latch assembly associated with the front door 1004; and controlling a second secondary actuation group of a lower latch assembly associated with the front door in tandem with controlling the first secondary actuation group 1006. The steps 1000, 1002, 1004, 1006 may consist of electrically controlling the first primary actuation group, the second primary actuation group, the first secondary actuation group, and the second secondary actuation group. The first primary actuation group, the second primary actuation group, the first secondary actuation group, and the second secondary actuation group may be mounted to the body of the vehicle.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. A dual door pillar-less door system for a motor vehicle with a front door and a rear door, the dual door pillar-less door system comprising:
   a first latch assembly including a first primary latch mechanism for the front door and having a first primary actuation group operable to control actuation of the front door and a secondary latch mechanism for the rear door and having a first secondary actuation group operable to control actuation of the rear door and a first controller unit coupled to the first primary actuation group and the first secondary actuation group and configured to control actuation of at least one of the first primary actuation group and the first secondary actuation group.

2. The dual door pillar-less door system for a vehicle as set forth in claim 1, further comprising:
   a second latch assembly including a second primary latch mechanism for the front door and having a second primary actuation group operable to control actuation of the front door and a second secondary latch mechanism for the rear door and having a second secondary actuation group operable to control actuation of the rear door and a second controller unit coupled to the second primary actuation group and the second secondary actuation group and configured to control actuation of at least one of the second primary actuation group and the second secondary actuation group.

3. The dual door pillar-less door system as set forth in claim 2, wherein the first controller unit and the second controller unit operate in synchronicity to control actuation of the front door independently from actuation of the rear door.

4. The dual door pillar-less door system as set forth in claim 2, wherein the first controller unit and the second controller unit are in operable communication with one another.

5. The dual door pillar-less door system as set forth in claim 4, wherein one of the first controller unit and the second controller unit is further configured to:
   receive at least one closure member opening command;
   control actuation of at least one of the primary actuation group and the secondary actuation group associated with the one of the first controller unit and the second controller unit having received the at least one closure member opening command; and
   transmit the at least one closure member opening command to the other one of the first controller unit and the second controller unit to control actuation of at least one of the primary actuation group and the secondary actuation group associated with the other one of the first controller unit and the second controller unit.

6. The dual door pillar-less door system as set forth in claim 1, further comprising a first motor associated with the front door to move the front door and a second motor associated with rear door to move the rear door, wherein the first motor, the second motor, the first controller unit and the second controller unit are electrically connected to a master controller.

7. The dual door pillar-less door system as set forth in claim 1, wherein a first latch assembly comprises a first frame plate mounted at an upper body of the vehicle, wherein the first primary latch mechanism is mounted to the first frame plate, and the second latch assembly comprises a second frame plate mounted at a lower body of the vehicle, wherein the secondary latch mechanism is mounted to the second frame plate.

8. A method of operating a dual door pillar-less door system of a vehicle with a front closure member and a rear closure, comprising the steps of:
   receiving at least one closure member opening command from an input source selected from the group comprising a handle switch, a body control module, and a key fob;
   determining which of a primary actuation group and a secondary actuation group of at least one latch assembly to actuate; and
   controlling actuation of at least one of the primary actuation group and the secondary actuation group of the at least one latch assembly based on the determination of which of the primary actuation group and the secondary actuation group to actuate.

9. The method as set forth in claim 8, further comprising controlling a first motor to move the front closure member after controlling actuation of the primary actuation group, and controlling a second motor to move the rear closure member after controlling the secondary actuation group.

10. The method as set forth in claim 8, wherein the at least one latch assembly includes an upper latch assembly and a lower latch assembly, and wherein the step of controlling actuation of at least one of the primary actuation group and the secondary actuation group of the upper latch assembly and the lower latch assembly includes synchronizing actuation of the primary actuation group and the secondary actuation group of each of the upper latch assembly and the lower latch assembly.

11. The method as set forth in claim 8, wherein the step of controlling actuation of at least one of the primary actuation group and the secondary actuation group of the at least one latch assembly includes controlling the primary actuation group and the secondary actuation group independently.

* * * * *